US010862658B2

(12) United States Patent
Suzuki et al.

(10) Patent No.: US 10,862,658 B2
(45) Date of Patent: Dec. 8, 2020

(54) TERMINAL DEVICE, BASE STATION DEVICE, INTEGRATED CIRCUIT, AND WIRELESS COMMUNICATION METHOD

(71) Applicant: Sharp Kabushiki Kaisha, Osaka (JP)

(72) Inventors: Shoichi Suzuki, Osaka (JP); Tatsushi Aiba, Osaka (JP); Kazunari Yokomakura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 309 days.

(21) Appl. No.: 14/429,889

(22) PCT Filed: Mar. 17, 2014

(86) PCT No.: PCT/JP2014/057188
§ 371 (c)(1),
(2) Date: Mar. 20, 2015

(87) PCT Pub. No.: WO2014/148442
PCT Pub. Date: Sep. 25, 2014

(65) Prior Publication Data
US 2015/0229462 A1 Aug. 13, 2015

(30) Foreign Application Priority Data

Mar. 22, 2013 (JP) ................................ 2013-059889

(51) Int. Cl.
*H04L 5/14* (2006.01)
*H04W 72/04* (2009.01)
(Continued)

(52) U.S. Cl.
CPC .............. *H04L 5/14* (2013.01); *H04L 1/1812* (2013.01); *H04L 1/1854* (2013.01);
(Continued)

(58) Field of Classification Search
CPC ... H04L 1/1812; H04L 41/0803; H04L 5/001; H04L 5/0055; H04L 5/0094; H04L 5/14;
(Continued)

(56) References Cited

U.S. PATENT DOCUMENTS

2013/0136108 A1* 5/2013 Cheng .................. H04L 1/1861
370/336
2013/0155915 A1* 6/2013 Park ..................... H04W 72/042
370/280
(Continued)

FOREIGN PATENT DOCUMENTS

WO 2013/025143 A1 2/2013

OTHER PUBLICATIONS

Ericsson et al., "On Standardization Impact of TDD UL-DL Adaptation," 3GPP TSG-RAN WG1 #69, R1-122016, May 21-25, 2012, pp. 1-3.
(Continued)

Primary Examiner — Huy D Vu
Assistant Examiner — Nizam U Ahmed
(74) Attorney, Agent, or Firm — Keating & Bennett, LLP

(57) ABSTRACT

A wireless communication system to which carrier aggregation is applied performs effective traffic adaptation. In a terminal device which communicates with a base station device using two serving cells including one primary cell and one secondary cell, in a case that a UL-DL configuration for the primary cell is different from a first downlink reference UL-DL configuration for the secondary cell and the serving cell is the secondary cell, a second downlink reference UL-DL configuration for the serving cell is set on the basis of a pair which is formed by the UL-DL configuration for the primary cell and the first downlink reference UL-DL configuration for the serving cell.

12 Claims, 17 Drawing Sheets

(51) Int. Cl.
*H04L 5/00* (2006.01)
*H04L 1/18* (2006.01)
*H04L 12/24* (2006.01)
*H04L 1/16* (2006.01)
*H04W 88/08* (2009.01)

(52) U.S. Cl.
CPC .......... *H04L 5/0055* (2013.01); *H04L 5/0094* (2013.01); *H04L 41/0803* (2013.01); *H04W 72/042* (2013.01); *H04W 72/0413* (2013.01); *H04W 72/0446* (2013.01); *H04L 1/1671* (2013.01); *H04L 5/001* (2013.01); *H04L 5/1469* (2013.01); *H04W 88/08* (2013.01)

(58) Field of Classification Search
CPC ............ H04L 5/1469; H04W 72/0413; H04W 72/042; H04W 72/0446; H04W 88/08
USPC ........................................................ 370/280
See application file for complete search history.

(56) References Cited

U.S. PATENT DOCUMENTS

| 2013/0301401 | A1* | 11/2013 | Wang | H04W 72/0413 370/209 |
| 2013/0322389 | A1* | 12/2013 | Maeda | H04L 5/001 370/329 |
| 2014/0050113 | A1* | 2/2014 | Rosa | H04W 52/0229 370/252 |
| 2014/0198746 | A1* | 7/2014 | Ahn | H04L 5/001 370/329 |
| 2014/0269539 | A1* | 9/2014 | Yin | H04L 5/0092 370/329 |

OTHER PUBLICATIONS

Ericsson et al., "Signalling Support For Dynamic TDD," 3GPP TSG-RAN WG1 #72, R1-130558, Jan. 28-Feb. 1, 2013, 3 pages.

* cited by examiner

FIG. 9

| UPLINK-DOWNLINK CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
|  | (2,2),(2,5) | 2 |
|  | (3,3),(3,4),(3,5) | 3 |
|  | (4,4),(4,5) | 4 |
|  | (5,5) | 5 |
| SET 2 | (1,0),(2,0),(3,0),(4,0),(5,0),(6,0) | 0 |
|  | (2,1),(4,1),(5,1) | 1 |
|  | (5,2) | 2 |
|  | (4,3),(5,3) | 3 |
|  | (5,4) | 4 |
|  | (1,6),(2,6),(3,6),(4,6),(5,6) | 6 |
| SET 3 | (3,1) | 1 |
|  | (3,2),(4,2) | 2 |
|  | (1,3),(2,3) | 3 |
|  | (2,4) | 4 |
| SET 4 | (0,0),(6,0) | 0 |
|  | (0,1),(0,2),(0,4),(0,5),(6,1),(6,2),(6,5) | 1 |
|  | (0,3),(0,6) | 3 |
|  | (6,4) | 4 |
|  | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U OR D |
| (c) | S | S OR D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U OR D |
| (g) | S | S | S |
| (h) | S | D | S OR D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

TERMINAL DEVICE, BASE STATION DEVICE, INTEGRATED CIRCUIT, AND WIRELESS COMMUNICATION METHOD

TECHNICAL FIELD

The present invention relates to a terminal device, a base station device, an integrated circuit, and a wireless communication method.

BACKGROUND ART

A cellular mobile communication wireless access system and a wireless network (hereinafter, referred to as "Long Term Evolution (LTE)" or "Evolved Universal Terrestrial Radio Access (EUTRA)") have been examined in Third Generation Partnership Project (3GPP). In the LTE system, an orthogonal frequency division multiplexing (OFDM) system has been used as a downlink communication system. In the LTE system, a single-carrier frequency division multiple access (SC-FDMA) system has been used as an uplink communication system. In the LTE system, a base station device is also referred to as evolved NodeB (eNodeB) and a mobile station device is also referred to as a user equipment (UE). The LTE system is a cellular communication system in which a plurality of coverage areas of the base station device are allocated in a cell shape. A single base station device may manage a plurality of cells.

The LTE system corresponds to a time division duplex (TDD) system. The LTE system using the TDD system is also referred to as a TD-LTE system or an LTE TDD system. The TDD system is a technique that performs time division multiplexing on an uplink signal and a downlink signal to perform full duplex communication in a single frequency band.

The 3GPP has examined the application of a traffic adaptation technique that changes the ratio of uplink resources to downlink resources depending on uplink traffic and downlink traffic and an interference reduction technique (DL-UL interference management and traffic adaptation) to the TD-LTE system.

NPL 1 discloses a method of using a flexible subframe as a method of achieving traffic adaptation. The base station device can receive uplink signals or transmit downlink signals in the flexible subframe. In NPL 1, the mobile station device regards the flexible subframe as a downlink subframe as long as the base station device does not instruct the mobile station device to transmit the uplink signals in the flexible subframe. The traffic adaptation technique is also referred to as dynamic TDD.

NPL 1 discloses a technique that determines hybrid automatic repeat request (HARQ) timing for a physical downlink shared channel (PDSCH) on the basis of the uplink-downlink configuration to be newly introduced and determines the HARQ timing for a physical uplink shared channel (PUSCH) on the basis of the initial UL-DL configuration.

NPL 2 discloses the following techniques: (a) a UL/DL reference configuration is introduced; and (b) some subframes are scheduled for uplink or downlink by a dynamic grant/assignment from a scheduler.

In LTE release 10, a carrier aggregation technique which sets a plurality of cells to a mobile station device has been introduced.

CITATION LIST

Non-Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21-25 May 2012.

NPL 2: "Signalling support for dynamic TDD", R1-130558, Ericsson, ST-Ericsson, 3GPP TSG-RAN WG1 Meeting #72, St Julian's, Malta, 28 Jan.-1 Feb. 2013.

DISCLOSURE OF THE INVENTION

Problems to be Solved by the Invention

When the traffic adaptation technique is applied, throughput is significantly improved, as compared to when the ratio of the uplink resources to the downlink resources is not changed. However, the technique that performs the traffic adaptation in the wireless communication system to which the carrier aggregation is applied has not been sufficiently examined.

The invention has been made in view of the above-mentioned problems and an object of the invention is to provide a terminal device, a base station device, an integrated circuit, and a wireless communication method that can perform effective traffic adaptation in a wireless communication system to which carrier aggregation is applied.

Means for Solving the Problems (1) In order to achieve the above-mentioned object, the invention has the following means. That is, according to an aspect of the invention, there is provided a terminal device that communicates with a base station device using two serving cells including one primary cell and one secondary cell. The terminal device includes: a setting unit that sets a UL-DL configuration for the primary cell, a UL-DL configuration for the secondary cell, and a first downlink reference UL-DL configuration for the secondary cell; a receiving unit that receives a physical downlink control channel and a physical downlink shared channel; and a transmitting unit that transmits a physical uplink shared channel corresponding to the physical downlink control channel on the basis of the UL-DL configuration or the uplink reference UL-DL configuration and transmits an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

(2) In the terminal device according to the above-mentioned aspect of the invention, the transmitting unit may transmit the HARQ-ACK in subframe n on the basis of detection of the physical downlink shared channel in subframe n-k for the serving cell. In a case that the UL-DL configuration for the primary cell is the same as the first downlink reference UL-DL configuration for the secondary cell, the value k may be given on the basis of the corresponding UL-DL configuration in the primary cell and may be given on the basis of the corresponding first downlink reference UL-DL configuration in the secondary cell. In a case that the UL-DL configuration for the primary cell is different from the first downlink reference UL-DL configuration for the secondary cell, the value k may be given on the basis of the corresponding second downlink reference UL-DL configuration in each of the two serving cells.

(3) In the terminal device according to the above-mentioned aspect of the invention, the setting unit may set the first downlink reference UL-DL configuration for the primary cell. In a case that the first downlink reference UL-DL configuration for the primary cell is set, the first downlink reference UL-DL configuration for the primary cell is different from the first downlink reference UL-DL configuration for the secondary cell, and the serving cell is the primary cell, the first downlink reference UL-DL configuration for the serving cell may be the second downlink reference UL-DL configuration for the serving cell. In a case that the first downlink reference UL-DL configuration for the primary cell is set, the first downlink reference UL-DL configuration for the primary cell is different from the first downlink reference UL-DL configuration for the secondary cell, and the serving cell is the secondary cell, the second downlink reference UL-DL configuration for the serving cell may be given on the basis of a pair which is formed by the first downlink reference UL-DL configuration for the primary cell and the first downlink reference UL-DL configuration for the serving cell.

(4) In the terminal device according to the above-mentioned aspect of the invention, in a case that the first downlink reference UL-DL configuration for the primary cell is set and the first downlink reference UL-DL configuration for the primary cell is the same as the first downlink reference UL-DL configuration for the secondary cell, the value k may be given on the basis of the corresponding first downlink reference UL-DL configuration in each of the two serving cells. In a case that the first downlink reference UL-DL configuration for the primary cell is set and the first downlink reference UL-DL configuration for the primary cell is different from the first downlink reference UL-DL configuration for the secondary cell, the value k may be given on the basis of the corresponding second downlink reference UL-DL configuration in each of the two serving cells.

(5) In the terminal device according to the above-mentioned aspect of the invention, in a case that the UL-DL configuration for the primary cell is different from the UL-DL configuration for the secondary cell, the serving cell is the secondary cell, and the terminal device is configured so as to monitor the physical downlink control channel with the carrier indicator field corresponding to the serving cell in the primary cell, the uplink reference UL-DL configuration for the serving cell may be given on the basis of a pair which is formed by the UL-DL configuration for the primary cell and the UL-DL configuration for the serving cell.

(6) In the terminal device according to the above-mentioned aspect of the invention, the transmitting unit may transmit the corresponding physical uplink control channel in subframe n+j on the basis of detection of the physical downlink control channel in subframe n for the serving cell. In a case that the UL-DL configuration for the primary cell is the same as the UL-DL configuration for the secondary cell, the value j may be given on the basis of the corresponding UL-DL configuration in each of the two serving cells. In a case that the UL-DL configuration for the primary cell is different from the UL-DL configuration for the secondary cell, the value j may be given on the basis of the corresponding uplink reference UL-DL configuration in each of the two serving cells.

(7) In the terminal device according to the above-mentioned aspect of the invention, the UL-DL configuration, the uplink reference UL-DL configuration, the first downlink reference UL-DL configuration, and the second downlink reference UL-DL configuration may be defined by a downlink subframe, an uplink subframe, and a special subframe in a frame.

(8) In the terminal device according to the above-mentioned aspect of the invention, the first downlink reference UL-DL configuration for the serving cell may indicate a subframe, which is indicated as the uplink subframe by the UL-DL configuration for the same serving cell, as the uplink subframe or the downlink subframe and may indicate a subframe, which is indicated as the special subframe by the UL-DL configuration for the same serving cell, as the downlink subframe or the special subframe.

(9) According to another aspect of the invention, there is provided a base station device that communicates with a terminal device using two serving cells including one primary cell and one secondary cell. The base station device includes: a setting unit that sets a UL-DL configuration for the primary cell, a UL-DL configuration for the secondary cell, and a first downlink reference UL-DL configuration for the secondary cell; a transmitting unit that transmits a physical downlink control channel and a physical downlink shared channel; and a receiving unit that receives a physical uplink shared channel corresponding to the physical downlink control channel on the basis of the UL-DL configuration or the uplink reference UL-DL configuration and receives an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

(10) In the base station device according to the above-mentioned aspect of the invention, the receiving unit may receive the HARQ-ACK in subframe n on the basis of the transmission of the physical downlink shared channel in subframe n-k for the serving cell. In a case that the UL-DL configuration for the primary cell is the same as the first downlink reference UL-DL configuration for the secondary cell, the value k may be given on the basis of the corresponding UL-DL configuration in the primary cell and is given on the basis of the corresponding first downlink reference UL-DL configuration in the secondary cell. In a case that the UL-DL configuration for the primary cell is different from the first downlink reference UL-DL configuration for the secondary cell, the value k may be given on the basis of the corresponding second downlink reference UL-DL configuration in each of the two serving cells.

(11) In the base station device according to the above-mentioned aspect of the invention, the setting unit may set the first downlink reference UL-DL configuration for the primary cell. In a case that the first downlink reference UL-DL configuration for the primary cell is set, the first downlink reference UL-DL configuration for the primary cell is different from the first downlink reference UL-DL configuration for the secondary cell, and the serving cell is the primary cell, the first downlink reference UL-DL configuration for the serving cell may be the second downlink reference UL-DL configuration for the serving cell. In a case that the first downlink reference UL-DL configuration for the primary cell is set, the first downlink reference UL-DL configuration for the primary cell is different from the first downlink reference UL-DL configuration for the secondary cell, and the serving cell is the secondary cell, the second downlink reference UL-DL configuration for the serving cell may be given on the basis of a pair which is formed by the first downlink reference UL-DL configuration for the primary cell and the first downlink reference UL-DL configuration for the serving cell.

(12) In the base station device according to the above-mentioned aspect of the invention, in a case that the first downlink reference UL-DL configuration for the primary cell is set and the first downlink reference UL-DL configuration for the primary cell is the same as the first downlink reference UL-DL configuration for the secondary cell, the value k may be given on the basis of the corresponding first downlink reference UL-DL configuration in each of the two serving cells. In a case that the first downlink reference UL-DL configuration for the primary cell is set and the first downlink reference UL-DL configuration for the primary cell is different from the first downlink reference UL-DL configuration for the secondary cell, the value k may be given on the basis of the corresponding second downlink reference UL-DL configuration in each of the two serving cells.

(13) In the base station device according to the above-mentioned aspect of the invention, in a case that the UL-DL configuration for the primary cell is different from the UL-DL configuration for the secondary cell, the serving cell is the secondary cell, and the terminal device is configured so as to monitor the physical downlink control channel with the carrier indicator field corresponding to the serving cell in the primary cell, the uplink reference UL-DL configuration for the serving cell may be given on the basis of a pair which is formed by the UL-DL configuration for the primary cell and the UL-DL configuration for the serving cell.

(14) In the base station device according to the above-mentioned aspect of the invention, the receiving unit may receive the corresponding physical uplink control channel in subframe n+j on the basis of the transmission of the physical downlink control channel in subframe n for the serving cell. In a case that the UL-DL configuration for the primary cell is the same as the UL-DL configuration for the secondary cell, the value j may be given on the basis of the corresponding UL-DL configuration in each of the two serving cells. In a case that the UL-DL configuration for the primary cell is different from the UL-DL configuration for the secondary cell, the value j may be given on the basis of the corresponding uplink reference UL-DL configuration in each of the two serving cells.

(15) In the base station device according to the above-mentioned aspect of the invention, the UL-DL configuration, the uplink reference UL-DL configuration, the first downlink reference UL-DL configuration, and the second downlink reference UL-DL configuration may be defined by a downlink subframe, an uplink subframe, and a special subframe in a frame.

(16) In the base station device according to the above-mentioned aspect of the invention, the first downlink reference UL-DL configuration for the serving cell may indicate a subframe, which is indicated as the uplink subframe by the UL-DL configuration for the same serving cell, as the uplink subframe or the downlink subframe and may indicate a subframe, which is indicated as the special subframe by the UL-DL configuration for the same serving cell, as the downlink subframe or the special subframe.

(17) According to still another aspect of the invention, there is provided an integrated circuit that is provided in a terminal device which communicates with a base station device using two serving cells including one primary cell and one secondary cell and causes the terminal device to perform a series of functions including: a function of setting a UL-DL configuration for the primary cell, a UL-DL configuration for the secondary cell, and a first downlink reference UL-DL configuration for the secondary cell; a function of receiving a physical downlink control channel and a physical downlink shared channel; a function of transmitting a physical uplink shared channel corresponding to the physical downlink control channel on the basis of the UL-DL configuration or the uplink reference UL-DL configuration; and a function of transmitting an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

(18) According to yet another aspect of the invention, there is provided an integrated circuit that is provided in a base station device which communicates with a terminal device using two serving cells including one primary cell and one secondary cell and causes the base station device to perform a series of functions including: a function of setting a UL-DL configuration for the primary cell, a UL-DL configuration for the secondary cell, and a first downlink reference UL-DL configuration for the secondary cell; a function of transmitting a physical downlink control channel and a physical downlink shared channel; a function of receiving a physical uplink shared channel corresponding to the physical downlink control channel on the basis of the UL-DL configuration or the uplink reference UL-DL configuration; and a function of receiving an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

(19) According to still yet another aspect of the invention, there is provided a wireless communication method that is used for a terminal device which communicates with a base station device using two serving cells including one primary cell and one secondary cell. The wireless communication method includes: setting a UL-DL configuration for the primary cell, a UL-DL configuration for the secondary cell, and a first downlink reference UL-DL configuration for the secondary cell; receiving a physical downlink control channel and a physical downlink shared channel; transmitting a physical uplink shared channel corresponding to the physical downlink control channel on the basis of the UL-DL configuration or the uplink reference UL-DL configuration; and transmitting an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

(20) According to yet still another aspect of the invention, there is provided a wireless communication method that is used for a base station device which communicates with a terminal device using two serving cells including one primary cell and one secondary cell. The wireless communication method includes: setting a UL-DL configuration for the primary cell, a UL-DL configuration for the secondary cell, and a first downlink reference UL-DL configuration for the secondary cell; transmitting a physical downlink control channel and a physical downlink shared channel; receiving a physical uplink shared channel corresponding to the physical downlink control channel on the basis of the UL-DL configuration or the uplink reference UL-DL configuration; and receiving an HARQ-ACK corresponding to the physical downlink shared channel on the basis of the first downlink reference UL-DL configuration or a second downlink reference UL-DL configuration. In a case that the UL-DL configuration for the primary cell is different from the UL-DL configuration for the secondary cell and the serving cell is the primary cell, the UL-DL configuration for the serving cell is the uplink reference UL-DL configuration for the serving cell. In a case that the UL-DL configuration for the primary cell is different from the UL-DL configuration for the secondary cell, the serving cell is the secondary cell, and the terminal device is not configured so as to monitor the physical downlink control channel with a carrier indicator field corresponding to the serving cell in the primary cell, the UL-DL configuration for the serving cell is the uplink reference UL-DL configuration for the serving cell. In a case that the UL-DL configuration for the primary cell is different from the first downlink reference UL-DL configuration for the secondary cell and the serving cell is the primary cell, the UL-DL configuration for the serving cell is the second downlink reference UL-DL configuration for the serving cell. In a case that the UL-DL configuration for the primary cell is different from the first downlink reference UL-DL configuration for the secondary cell and the serving cell is the secondary cell, the second downlink reference UL-DL configuration for the serving cell is given on the basis of a pair which is formed by the UL-DL configuration for the primary cell and the first downlink reference UL-DL configuration for the serving cell.

Effects of the Invention

According to the invention, it is possible to perform effective traffic adaptation in a wireless communication system to which carrier aggregation is applied.

BRIEF DESCRIPTION OF THE DRAWINGS

FIG. 9 is a table illustrating an example of an uplink-downlink configuration in this embodiment.

FIG. 12 is a diagram illustrating a correspondence between a pair which is formed by a first uplink reference UL-DL configuration for another serving cell (primary cell) and a first uplink reference UL-DL configuration for a serving cell (secondary cell) and a second uplink reference UL-DL configuration for the secondary cell in this embodiment.

FIG. 14 is a diagram illustrating a correspondence between a pair which is formed by a first downlink reference UL-DL configuration for the primary cell and a first downlink reference UL-DL configuration for the secondary cell and a second downlink reference UL-DL configuration for the secondary cell in this embodiment.

FIG. 15 is a diagram illustrating the relationship between a subframe which is indicated by the first uplink reference UL-DL configuration and a subframe which is indicated by the first downlink reference UL-DL configuration in this embodiment.

FIG. 16 is a diagram illustrating the relationship among the subframe which is indicated by the first uplink reference UL-DL configuration, the subframe which is indicated by the first downlink reference UL-DL configuration, and a subframe which is indicated by a transmission direction UL-DL configuration in this embodiment.

FIG. 17 is a diagram illustrating the relationship among the first uplink reference UL-DL configuration, the first downlink reference UL-DL configuration, and the transmission direction UL-DL configuration in this embodiment.

FIG. 18 is a diagram illustrating a correspondence between subframe n in which a PDCCH/EPDCCH/PHICH is allocated and subframe n+k in which a PUSCH corresponding to the PDCCH/EPDCCH/PHICH is allocated in this embodiment.

FIG. 19 is a diagram illustrating a correspondence between subframe n in which a PHICH is allocated and subframe n-k in which a PUSCH corresponding to the PHICH is allocated in this embodiment.

FIG. 20 is a diagram illustrating a correspondence between subframe n in which a PUSCH is allocated and subframe n+k in which a PHICH corresponding to the PUSCH is allocated in this embodiment. The mobile station device 1 specifies (selects or determines) the value of k according to the table shown in FIG. 20.

FIG. 21 is a diagram illustrating a correspondence between subframe n-k in which a PDSCH is allocated and subframe n in which an HARQ-ACK corresponding to the PDSCH is transmitted in this embodiment. The mobile station device 1 specifies (selects or determines) the value of k according to the table shown in FIG. 21.

MODE FOR CARRYING OUT THE INVENTION

Hereinafter, an embodiment of the invention will be described.

In this embodiment, a plurality of cells are set to a mobile station device. A technique in which the mobile station device performs communication through the plurality of cells is referred to as cell aggregation or carrier aggregation. The invention may be applied to each of the plurality of cells which are set to the mobile station device. The invention may be applied to some of the set plurality of cells. The cell which is set to the mobile station device is also referred to as a serving cell.

The set plurality of serving cells include one primary cell and one or more secondary cells. The primary cell is a serving cell which is initially accessed, a serving cell whose connection is re-established, or a serving cell which is instructed by a handover command.

A time division duplex (TDD) system is applied as a wireless communication system according to this embodiment. In the case of the cell aggregation, the TDD system may be applied to some or all of the plurality of cells.

When the plurality of cells to which the TDD system is applied are aggregated, a half-duplex TDD system or a full-duplex TDD system is applied. In the half-duplex TDD system, the terminal is not capable of performing uplink transmission and downlink reception at the same time in the plurality of cells to which the TDD system is applied. In the full-duplex TDD system, the terminal can perform uplink transmission and downlink reception at the same time in the plurality of cells to which the TDD system is applied.

When a cell to which the TDD system is applied and a cell to which a frequency division duplex (FDD) system is applied are aggregated, the invention can be applied to the cell to which the TDD system is applied.

In this embodiment, "X/Y" includes the meaning of "X or Y". In this embodiment, "X/Y" includes the meaning of "X and Y". In this embodiment, "X/Y" includes the meaning of "X and/or Y".

Figure 1:
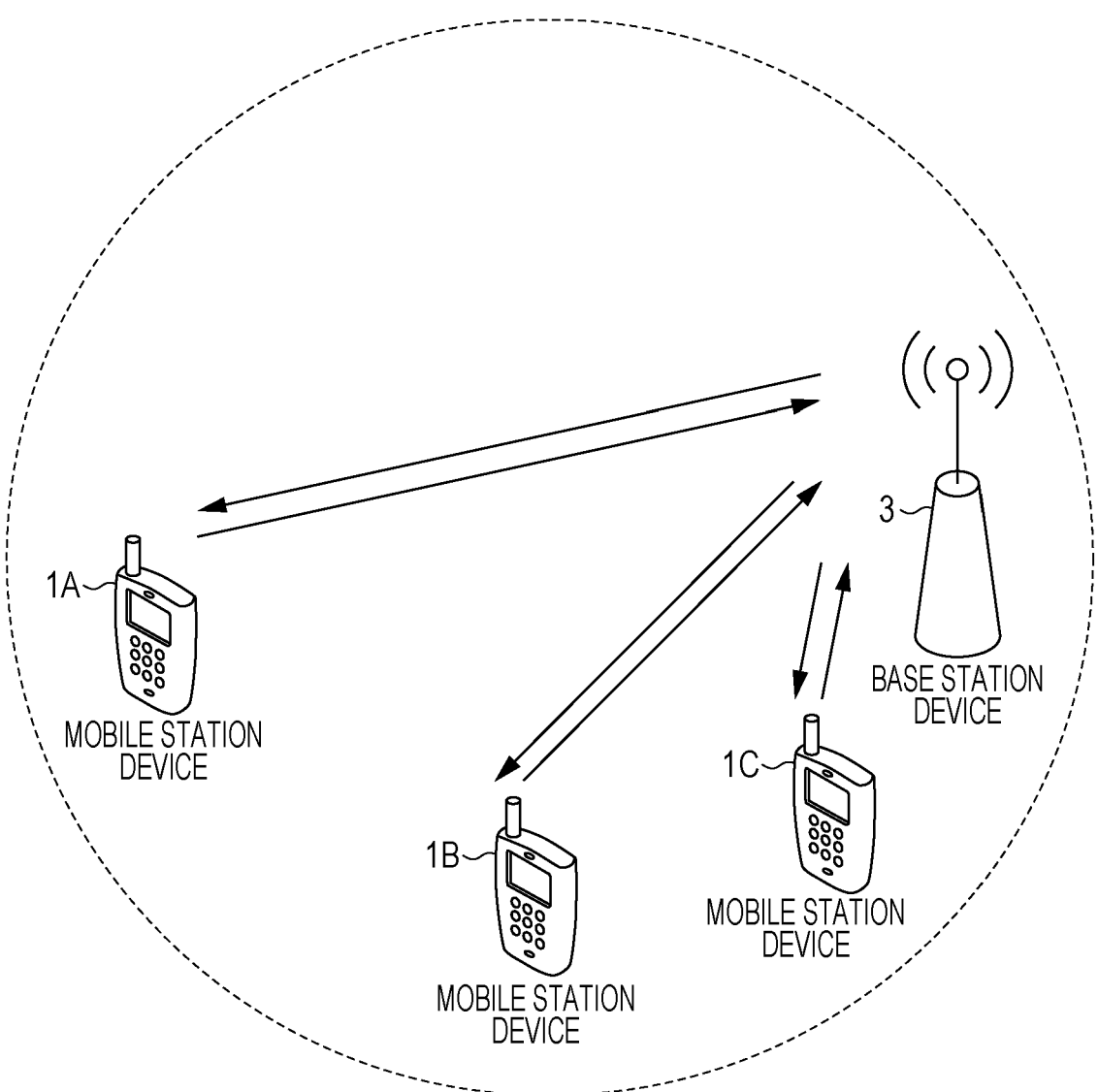
FIG. 1 is a conceptual diagram illustrating a wireless communication system according to this embodiment.

FIG. 1 is a conceptual diagram illustrating the wireless communication system according to this embodiment. In FIG. 1, the wireless communication system includes mobile station devices 1A to 1C and a base station device 3. Hereinafter, the mobile station devices 1A to 1C are referred to as mobile station devices 1.

Physical channels and physical signals according to this embodiment will be described.

In FIG. 1, in uplink wireless communication from the mobile station device 1 to the base station device 3, the following uplink physical channels are used:

A physical uplink control channel (PUCCH);
A physical uplink shared channel (PUSCH); and
A physical random access channel (PRACH).

The uplink physical channels are used to transmit information output from a higher layer.

The PUCCH is a physical channel that is used to transmit uplink control information (UCI). The uplink control information includes downlink channel state information (CSI), a scheduling request (SR) indicating a PUSCH resource request, and acknowledgement (ACK)/negative-acknowledgement (NACK) for downlink data (a transport block and a downlink-shared channel: DL-S CH). The ACK/NACK is also referred to as an HARQ-ACK, HARQ feedback, or response information.

The PUSCH is a physical channel that is used to transmit uplink data (uplink-shared channel: UL-SCH). In addition, the PUSCH may be used to transmit the HRQ-ACK and/or the channel state information in addition to the uplink data. The PUSCH may be used to transmit only the channel state information or only the ACK/NACK and the channel state information.

The PRACH is a physical channel that is used to transmit a random access preamble. The PRACH is mainly used by the mobile station device 1 to synchronize a time domain with the base station device 3. In addition, the PRACH is used for an initial connection establishment procedure, a handover procedure, a connection re-establishment procedure, synchronization with uplink transmission (timing adjustment), and a PUSCH resource request.

In FIG. 1, in uplink wireless communication, the following uplink physical signal is used:

An uplink reference signal (UL RS).

The uplink physical signal is not used to transmit information output from the higher layer, but is used by the physical layers.

In this embodiment, the following two types of uplink reference signals are used:

A demodulation reference signal (DMRS)
A sounding reference signal (SRS).

The DMRS relates to the transmission of the PUSCH or the PUCCH. The DMRS is time-multiplexed with the PUSCH or the PUCCH. The base station device 3 uses the DMRS in order to correct the propagation path of the PUSCH or the PUCCH. Hereinafter, the simultaneous transmission of the PUSCH and the DMRS is simply referred to as the transmission of the PUSCH. Hereinafter, the simultaneous transmission of the PUCCH and the DMRS is simply referred to as the transmission of the PUCCH.

The SRS does not relate to the transmission of the PUSCH or the PUCCH. The base station device 3 uses the SRS in order to measure the uplink channel state. The mobile station device 1 transmits a first SRS in a first resource which is set by the higher layer. When receiving information indicating a request for the transmission of the SRS through the PDCCH, the mobile station device 1 transmits a second SRS in a second resource which is set by the higher layer only one time. The first SRS is also referred to as a periodic SRS. The second SRS is also referred to as an aperiodic SRS.

In FIG. 1, in the downlink wireless communication from the base station device 3 to the mobile station device 1, the following downlink physical channels are used:

A physical broadcast channel (PBCH);
A physical control format indicator channel (PCFICH);
A physical hybrid automatic repeat request indicator channel (PHICH);
A physical downlink control channel (PDCCH);
An enhanced physical downlink control channel (EPDCCH); and
A physical downlink shared channel (PDSCH).

The downlink physical channels are used to transmit information output from the higher layer.

The PBCH is used to broadcast a master information block (MIB, broadcast channel (BCH)) which is shared by the mobile station devices 1. The MIB is transmitted at an interval of 40 ms. The MIB is repeatedly transmitted with a period of 10 ms. Specifically, the MIB is initially transmitted in subframe 0 of a radio frame which satisfies SFN mod 4=0. The MIB is repeated in subframe 0 of the other radio frames. A system frame number (SFN) is the number of the radio frame. The MIB is system information. For example, the MIB includes information indicating the SFN.

The PCFICH is used to transmit information for designating a region (OFDM symbol) which is used to transmit the PDCCH.

The PHICH is used to transmit an HARQ indicator (HARQ feedback or response information) which indicates acknowledgement (ACK) or negative acknowledgement (NACK) for uplink data (uplink shared channel: UL-SCH) received by the base station device 3. For example, when receiving the HARQ indicator indicating the ACK, the mobile station device 1 does not re-transmit corresponding uplink data. For example, when receiving the HARQ indicator indicating the NACK, the mobile station device 1 re-transmits corresponding uplink data. A single PHICH transmits the HARQ indicator for a single uplink data item. The base station device 3 transmits the HARQ indicators for a plurality of uplink data items which are included in the same PUSCH, using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment.

The downlink grant is downlink control information which is used to schedule a single PDSCH in a single cell. The downlink grant is used to schedule the PDSCH in the same subframe as that in which the downlink grant is transmitted. The uplink grant is downlink control information which is used to schedule a single PUSCH in a single cell. The uplink grant is used to schedule a single PUSCH in a subframe that is four or more subframes after the subframe in which the uplink grant is transmitted.

A cyclic redundancy check (CRC) parity bit is added to the DCI format. The CRC parity bit is scrambled with a cell-radio network temporary identifier (C-RNTI) or a semi persistent scheduling cell-radio network temporary identifier (SPS C-RNTI). The C-RNTI and the SPS C-RNTI are identifiers for identifying the mobile station device in the cell.

The C-RNTI is used to control the PDSCH or the PUSCH in a single subframe. The SPS C-RNTI is used to periodically allocate the PDSCH or PUSCH resources.

The PDSCH is used to transmit downlink data (downlink shared channel: DL-SCH).

In FIG. 1, in the downlink wireless communication, the following downlink physical signals are used:

A synchronizing signal (SS); and
A downlink reference signal (DL RS).

The downlink physical signals are not used to transmit information output from the higher layer, but are used by the physical layers.

The synchronizing signal is used by the mobile station device 1 to synchronize a downlink frequency domain and a downlink time domain. In the TDD system, the synchronizing signal is mapped only in subframes 0, 1, 5, and 6 of the radio frame. In the FDD system, the synchronizing signal is mapped only in subframes 0 and 5 of the radio frame.

The downlink reference signal is used by the mobile station device 1 to correct the propagation path of the downlink physical channel. The downlink reference signal is used by the mobile station device 1 to calculate downlink channel state information.

In this embodiment, the following five types of downlink reference signals are used:

A cell-specific reference signal (CRS)
A UE-specific reference signal (URS) related to PDSCH;
A demodulation reference signal (DMRS) related to EPDCCH;
A non-zero power channel state information reference signal (NZP CSI-RS); and
A zero power channel state information reference signal (ZP CSI-RS).

The CRS is transmitted in all subframes. The CRS is used to demodulate PBCH/PDCCH/PHICH/PCFICH/PDSCH. The CRS may be used by the mobile station device 1 to calculate the downlink channel state information. The PBCH/PDCCH/PHICH/PCFICH is transmitted through an antenna port which is used to transmit the CRS.

The URS related to the PDSCH is transmitted in the subframe and band which are used to transmit the PDSCH related to the URS. The URS is used to demodulate the PDSCH to which the URS is related.

The PDSCH is transmitted through an antenna port which is used to transmit the CRS or the URS. A DCI format 1A is used to schedule the PDSCH that is transmitted through the antenna port used to transmit the CRS. A DCI format 2D is used to schedule the PDSCH that is transmitted through the antenna port used to transmit the URS.

The DMRS related to the EPDCCH is transmitted in the subframe and band that are used to transmit the EPDCCH to which the DMRS is related. The DMRS is used to demodulate the EPDCCH to which the DMRS is related. The EPDCCH is transmitted through an antenna port which is used to transmit the DMRS.

The NZP CSI-RS is transmitted in the set subframe. The resources to which the NZP CSI-RS is transmitted are set by the base station device. The NZP CSI-RS is used by the mobile station device 1 to calculate the downlink channel state information.

The resources of the ZP CSI-RS are set by the base station device. The base station device transmits the ZP CSI-RS with zero output. That is, the base station device does not transmit the ZP CSI-RS. The base station device does not transmit the PDSCH and the EPDCCH in the set resources of the ZP CSI-RS. For example, the mobile station device 1 can measure interference in resources corresponding to the NZP CSI-RS in a given cell.

The downlink physical channel and the downlink physical signal are generically referred to as a downlink signal. The uplink physical channel and the uplink physical signal are generically referred to as an uplink signal. The downlink physical channel and the uplink physical channel are generically referred to as a physical channel. The downlink physical signal and the uplink physical signal are generically referred to as a physical signal.

The BCH, the UL-SCH, and the DL-SCH are transport channels. The channel which is used in a medium access control (MAC) layer is referred to as a transport channel. The unit of the transport channel used in the MAC layer is also referred to as a transport block (TB) or a MAC protocol data unit (PDU). Hybrid automatic repeat request (HARQ) control is performed for each transport block in the MAC layer. The transport block is the unit of data which is transmitted (delivered) by the MAC layer to the physical layer. In the physical layer, the transport block is mapped to a code word and a coding process is performed for each code word.

Hereinafter, the structure of the radio frame according to this embodiment will be described.

Figure 2:
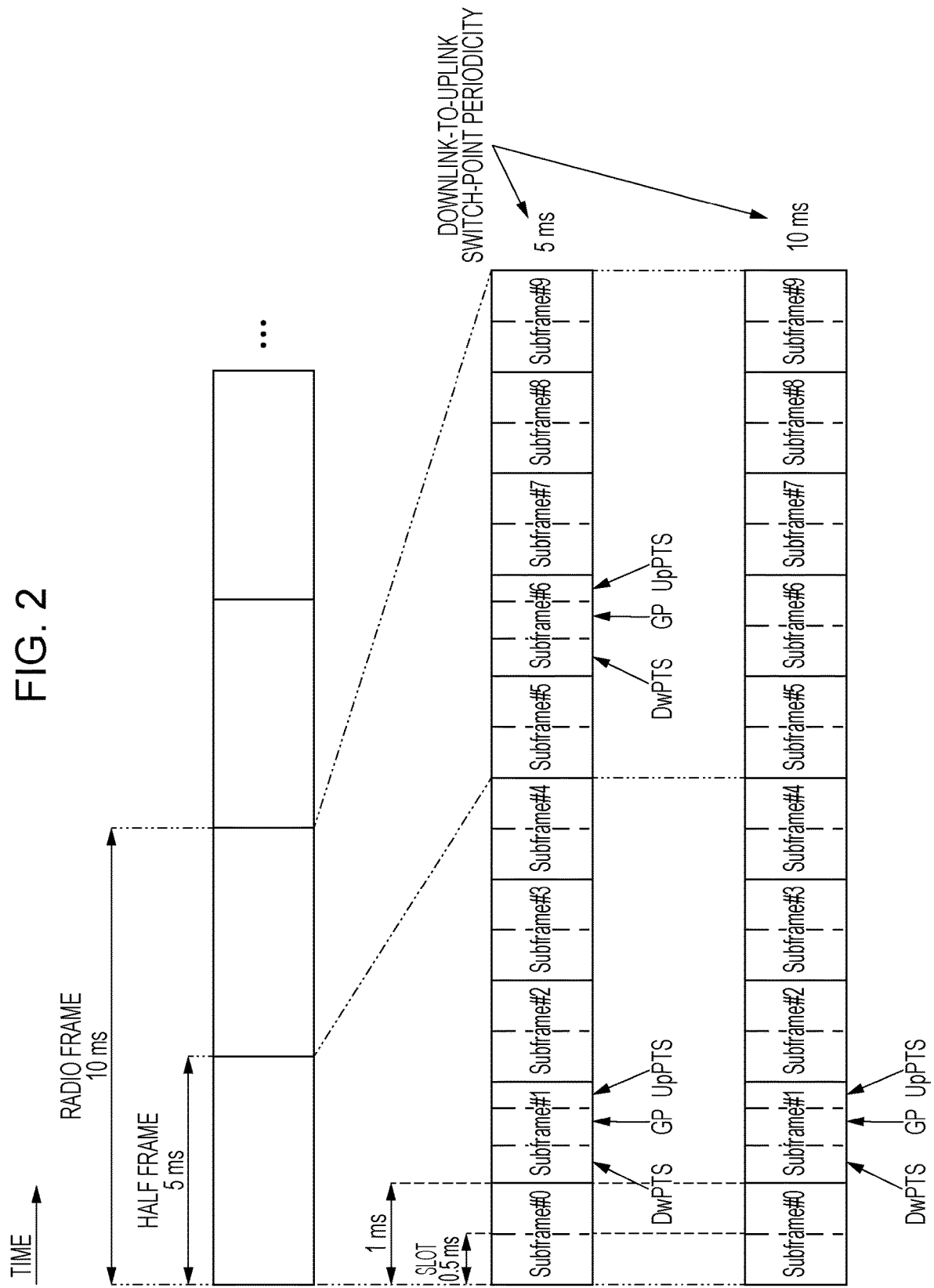
FIG. 2 is a diagram illustrating the schematic structure of a radio frame according to this embodiment.

FIG. 2 is a diagram illustrating the schematic structure of the radio frame according to this embodiment. The radio frame has a length of 10 ms. Each radio frame includes two half frames. Each of the half frames has a length of 5 ms. Each of the half frames includes five subframes. Each of the subframes has a length of 1 ms and is defined by two consecutive slots. Each of the slots has a length of 0.5 ms. In the radio frame, an i-th subframe includes a (2×i)-th slot and a (2×i+1)-th slot. That is, 10 subframes can be used for an interval of 10 ms.

In this embodiment, the following three types of subframes are defined:

A downlink subframe (first subframe);
An uplink subframe (second subframe); and
A special subframe (third subframe).

The downlink subframe is reserved for downlink transmission. The uplink subframe is reserved for uplink transmission. The special subframe includes three fields. The three fields are a downlink pilot time slot (DwPTS), a guard period (GP), and an uplink pilot time slot (UpPTS). The total length of the DwPTS, the GP, and the UpPTS is 1 ms. The DwPTS is a field which is reserved for downlink transmission. The UpPTS is a field which is reversed for uplink transmission. The GP is a field in which downlink transmission and uplink transmission are not performed. The special subframe may include only the DwPTS and the GP or it may include only the GP and the UpPTS.

A single radio frame includes at least the downlink subframe, the uplink subframe, and the special subframe.

The wireless communication system according to this embodiment supports a downlink-uplink switch-point periodicity of 5 ms and 10 ms. When the downlink-uplink switch-point periodicity is 5 ms, the special subframe is included in two half frames of the radio frame. When the downlink-uplink switch-point periodicity is 10 ms, the special subframe is included only in the first half frame of the radio frame.

Next, the structure of the slot according to this embodiment will be described.

Figure 3:
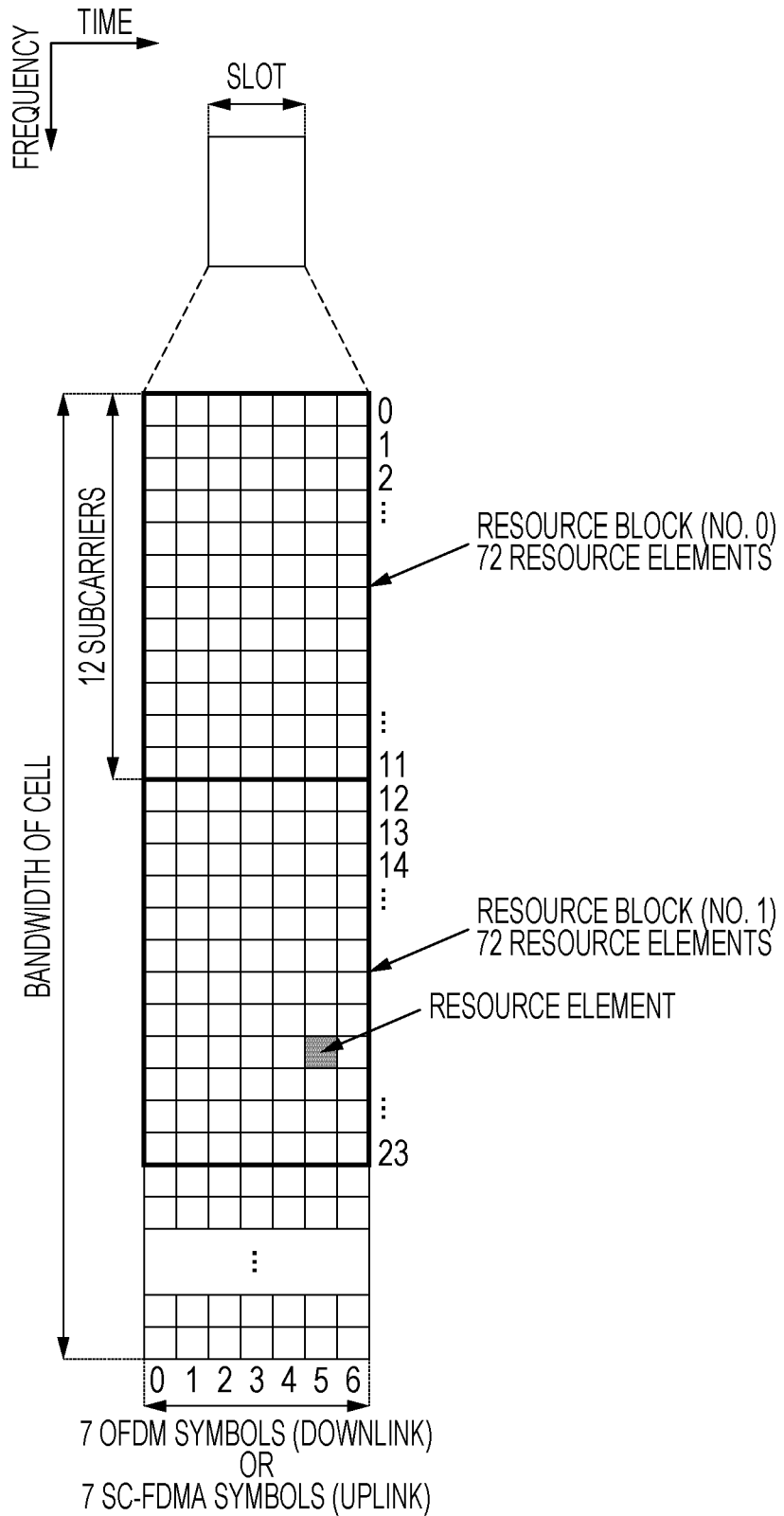
FIG. 3 is a diagram illustrating the structure of a slot according to this embodiment.

FIG. 3 is a diagram illustrating the structure of the slot according to this embodiment. The physical signal or the physical channel which is transmitted in each slot is represented by a resource grid. In the downlink, the resource grid is defined by a plurality of subcarriers and a plurality of OFDM symbols. In the uplink, the resource grid is defined by a plurality of subcarriers and a plurality of SC-FDMA symbols. The number of subcarriers forming one slot depends on the bandwidth of the cell. Seven OFDM symbols or SC-FDMA symbols form one slot. Each element in the resource grid is referred to as a resource element. The resource element is identified by the number of the subcarrier and the number of the OFDM symbol or the SC-FDMA symbol.

The resource block is used to represent the mapping of a given physical channel (for example, the PDSCH or the PUSCH) to the resource element. For the resource block, a virtual resource block and a physical resource block are defined. First, a given physical channel is mapped to the virtual resource block. Then, the virtual resource block is mapped to the physical resource block. One physical resource block is defined from 7 continuous OFDM symbols or SC-FDMA symbols in the time domain and 12 contiguous subcarriers in the frequency domain. Therefore, one physical resource block includes (7×12) resource elements. In addition, one physical resource block corresponds to one slot in the time domain and corresponds to 180 kHz in the frequency domain. The physical resource block is numbered from 0 in the frequency domain.

Next, the physical channel and the physical signal which are transmitted in each subframe will be described.

Figure 4:
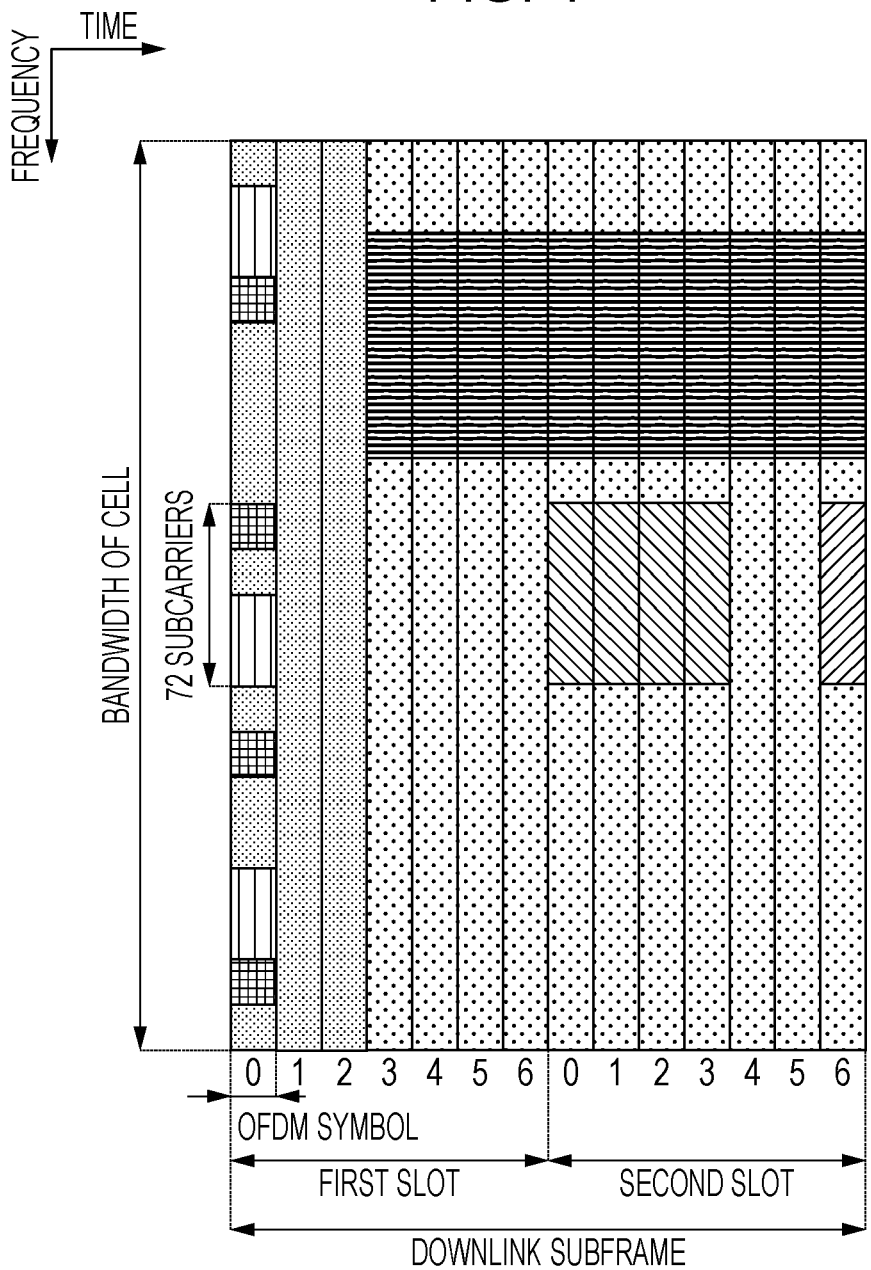
FIG. 4 is a diagram illustrating an example of the mapping of physical channels and physical signals in a downlink subframe according to this embodiment.

FIG. 4 is a diagram illustrating an example of the mapping of the physical channels and the physical signals in the downlink subframe according to this embodiment. The base station device 3 may transmits the downlink physical channels (the PBCH, the PCFICH, the PHICH, vPDCCH, the EPDCCH, and the PDSCH) and the downlink physical signals (the synchronizing signal and the downlink reference signal) in the downlink subframe. The PBCH is transmitted only in subframe 0 of the radio frame. The downlink reference signal is mapped in the resource elements dispersed in the frequency domain and the time domain. For simplicity of illustration, the downlink reference signal is not shown in FIG. 4.

In a PDCCH region, frequency multiplexing and time multiplexing may be performed on a plurality of PDCCHs. In an EPDCCH region, frequency multiplexing, time multiplexing, and spatial multiplexing may be performed on a plurality of EPDCCHs. In a PDSCH region, frequency multiplexing and spatial multiplexing may be performed on a plurality of PDSCHs. Time multiplexing may be performed on the PDCCH and the PDSCH or the EPDCCH. Frequency multiplexing may be performed on the PDSCH and the EPDCCH.

Figure 5:
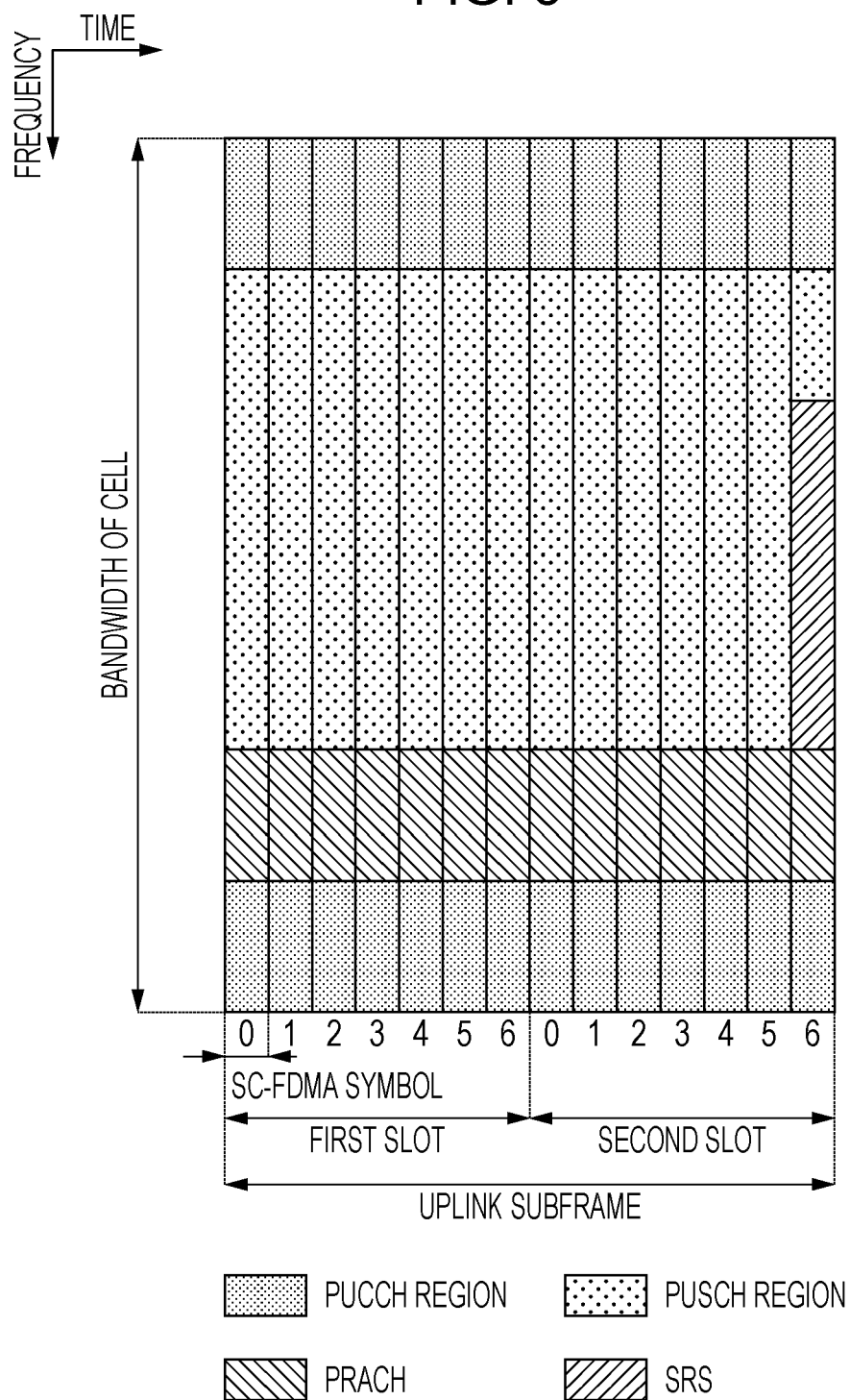
FIG. 5 is a diagram illustrating an example of the mapping of physical channels and physical signals in an uplink subframe according to this embodiment.

FIG. 5 is a diagram illustrating an example of the mapping of the physical channels and the physical signals in the uplink subframe according to this embodiment. The mobile station device 1 may transmit the uplink physical channels (the PUCCH, the PUSCH, and the PRACH) and the uplink physical signals (the DMRS and the SRS) in the uplink subframe. In a PUCCH region, frequency multiplexing, time multiplexing, and code multiplexing are performed on a plurality of PUCCHs. In a PUSCH region, frequency multiplexing and spatial multiplexing may be performed on a plurality of PUSCHs. Frequency multiplexing may be performed on the PUCCH and the PUSCH. The PRACH may be allocated over a single subframe or two subframes. Code multiplexing may be performed on a plurality of PRACHs.

The SRS is transmitted using the last SC-FDMA symbol in the uplink subframe. That is, the SRS is mapped in the last SC-FDMA symbol of the uplink subframe. The mobile station device 1 is not capable of transmitting the SRS and the PUCCH/PUSCH/PRACH at the same time with a single SC-FDMA symbol of a single cell. The mobile station device 1 can transmit the PUSCH and/or the PUCCH using an SC-FDMA symbol except for the last SC-FDMA symbol in a single uplink subframe of a single cell and transmit the SRS using the last SC-FDMA symbol in the uplink subframe. That is, the mobile station device 1 can transmit both the SRS and the PUSCH/PUCCH in the single uplink subframe of the single cell. Time multiplexing is performed on the DMRS and the PUCCH or the PUSCH. For simplicity of illustration, the DMRS is not shown in FIG. 5.

Figure 6:
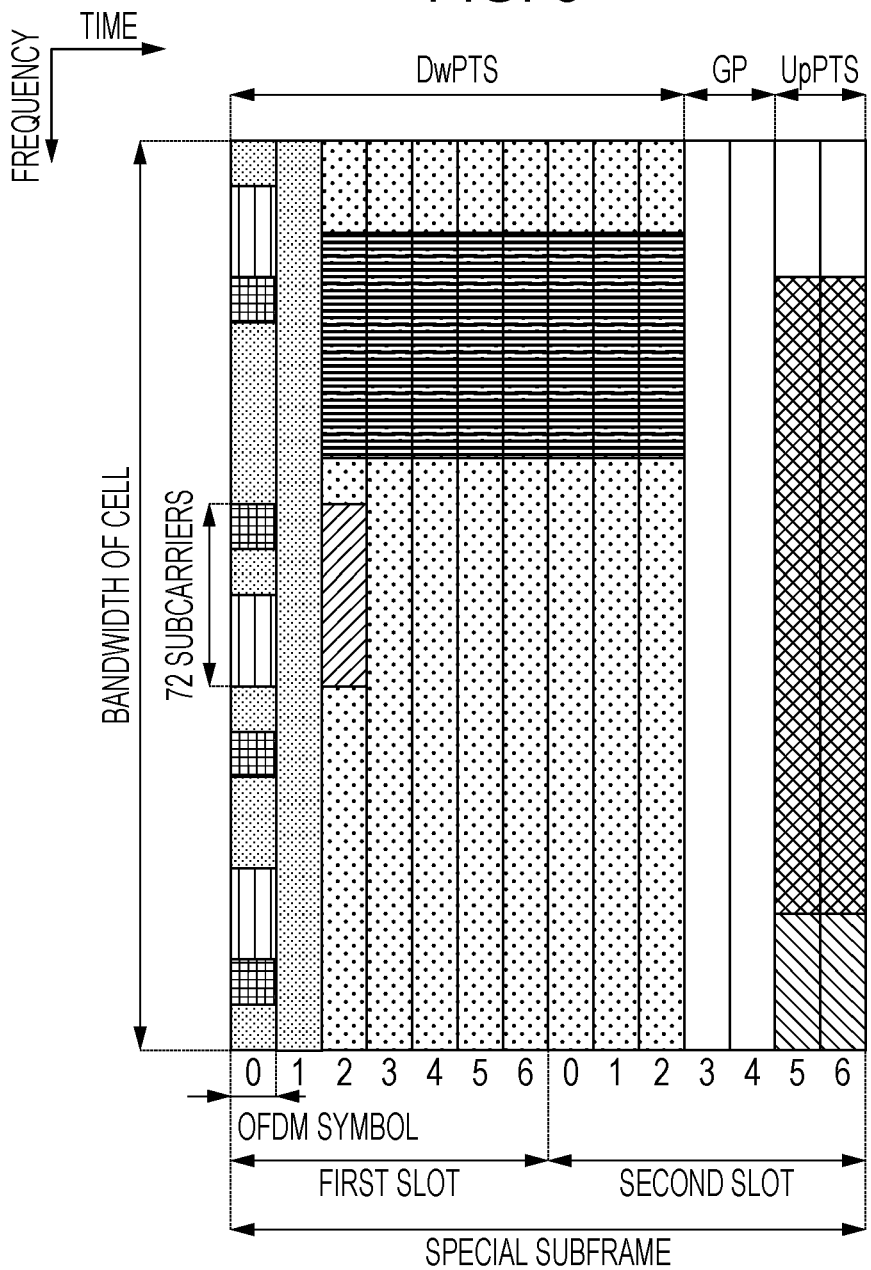
FIG. 6 is a diagram illustrating an example of the mapping of physical channels and physical signals in a special subframe according to this embodiment.

FIG. 6 is a diagram illustrating an example of the mapping of the physical channels and the physical signals in the special subframe according to this embodiment. In FIG. 6, the DwPTS includes first to ninth SC-FDMA symbols in the special subframe, the GP includes tenth to twelfth SC-FDMA symbols in the special subframe, and the UpPTS includes thirteenth and fourteenth SC-FDMA symbols in the special subframe.

The base station device 3 may transmit the PCFICH, the PHICH, the PDCCH, the EPDCCH, the PDSCH, the synchronizing signal, and the downlink reference signal in the DwPTS of the special subframe. The base station device 3 does not transmit the PBCH in the DwPTS of the special subframe. The mobile station device 1 may transmit the PRACH and the SRS in UpPTS of the special subframe. That is, the mobile station device 1 does not transmit the PUCCH, the PUSCH, and the DMRS in the UpPTS of the special subframe.

Figure 7:
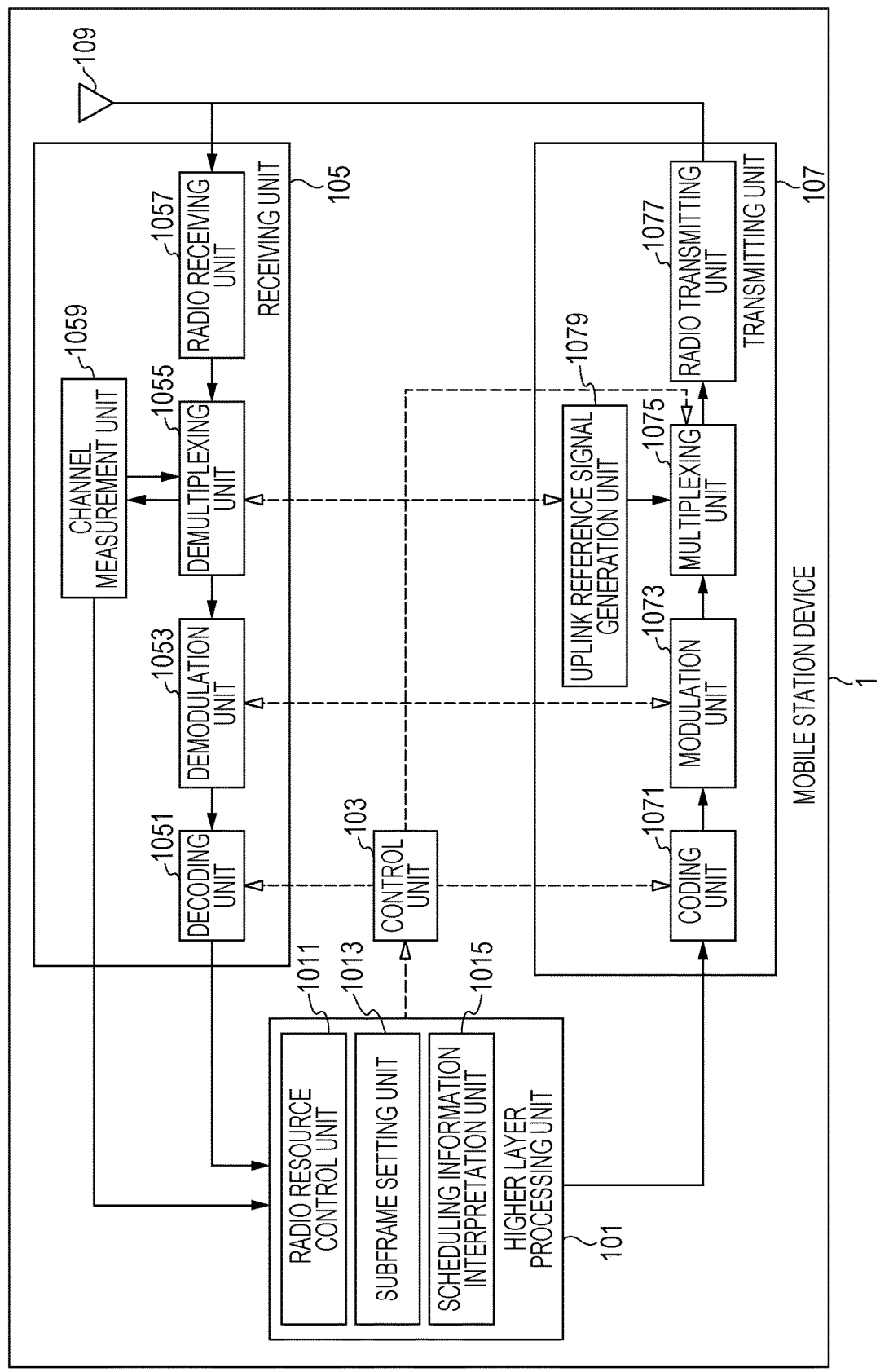
FIG. 7 is a schematic block diagram illustrating the structure of a mobile station device 1 according to this embodiment.

FIG. 7 is a schematic block diagram illustrating the structure of the mobile station device 1 according to this embodiment. As shown in FIG. 7, the mobile station device 1 includes a higher layer processing unit 101, a control unit 103, a receiving unit 105, a transmitting unit 107, and a transmitting/receiving antenna 109. The higher layer processing unit 101 includes a radio resource control unit 1011, a subframe setting unit 1013, and a scheduling information interpretation unit 1015. The receiving unit 105 includes a decoding unit 1051, a demodulation unit 1053, a demultiplexing unit 1055, a radio receiving unit 1057, and a channel measurement unit 1059. The transmitting unit 107 includes a coding unit 1071, a modulation unit 1073, a multiplexing unit 1075, a radio transmitting unit 1077, and an uplink reference signal generation unit 1079.

The higher layer processing unit 101 outputs uplink data (transport block) generated by, for example, the operation of the user to the transmitting unit 107. The higher layer processing unit 101 processes a medium access control (MAC) layer, a packet data convergence protocol (PDCP) layer, a radio link control (RLC) layer, and a radio resource control (RRC) layer.

The radio resource control unit 1011 of the higher layer processing unit 101 manages various kinds of setting information of the host device. In addition, the radio resource control unit 1011 generates information to be mapped in each uplink channel and outputs the information to the transmitting unit 107.

The subframe setting unit 1013 of the higher layer processing unit 101 manages a first uplink reference UL-DL configuration (uplink reference configuration), a first downlink reference UL-DL configuration (downlink reference configuration), a second uplink reference UL-DL configuration, a second downlink reference UL-DL configuration, and a transmission direction UL-DL configuration (transmission direction configuration).

The subframe setting unit 1013 sets the first uplink reference UL-DL configuration, the first downlink reference UL-DL configuration, the second uplink reference UL-DL configuration, the second downlink reference UL-DL configuration, and the transmission direction UL-DL configuration.

The scheduling information interpretation unit 1015 of the higher layer processing unit 101 interprets the DCI format (scheduling information) which is received through the receiving unit 105, generates control information for controlling the receiving unit 105 and the transmitting unit 107 on the basis of the interpretation result of the DCI format, and outputs the control information to the control unit 103.

In addition, the scheduling information interpretation unit 1015 determines the time when the transmitting process and the receiving process are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The control unit 103 generates control signals for controlling the receiving unit 105 and the transmitting unit 107, on the basis of the control information from the higher layer processing unit 101. The control unit 103 outputs the generated control signals to the receiving unit 105 and the transmitting unit 107 to control the receiving unit 105 and the transmitting unit 107.

The receiving unit 105 performs demultiplexing, demodulation, and decoding on the signal which is received from the base station device 3 through the transmitting/receiving antenna 109 in response to the control signal input from the control unit 103 and outputs the decoded information to the higher layer processing unit 101.

The radio receiving unit 1057 converts the downlink signal received through the transmitting/receiving antenna 109 into a signal with an intermediate frequency (down conversion), removes an unnecessary frequency component, and controls an amplification level such that a signal level is appropriately maintained, performs quadrature demodulation on the basis of an in-phase component and a quadrature component of the received signal, and converts the quadrature-demodulated analog signal into a digital signal. The radio receiving unit 1057 removes a portion corresponding to a guard interval (GI) from the converted digital signal and performs fast Fourier transform (FFT) on the signal from which the guard interval has been removed to extract a signal in the frequency domain.

The demultiplexing unit 1055 demultiplexes the extracted signal into the PHICH, the PDCCH, the EPDCCH, the PDSCH, and the downlink reference signal. In addition, the demultiplexing unit 1055 compensates for the propagation path of the PHICH, the PDCCH, the EPDCCH, and the PDSCH from the estimated value of the propagation path which is input from the channel measurement unit 1059. The demultiplexing unit 1055 outputs the demultiplexed downlink reference signal to the channel measurement unit 1059.

The demodulation unit 1053 multiplies the PHICH by a corresponding code, synthesizes them, and demodulates the synthesized signal using a binary phase shift keying (BPSK) modulation method, and outputs the demodulated signal to the decoding unit 1051. The decoding unit 1051 decodes the PHICH addressed to the host device and outputs the decoded HARQ indicator to the higher layer processing unit 101. The demodulation unit 1053 demodulates the PDCCH and/or the EPDCCH using a PSK modulation method and outputs the demodulated PDCCH and/or EPDCCH to the decoding unit 1051. The decoding unit 1051 tries to decode the PDCCH and/or the EPDCCH. When decoding has succeeded, the decoding unit 1051 outputs the decoded downlink control information and the RNTI corresponding to the downlink control information to the higher layer processing unit 101.

The demodulation unit 1053 demodulates the PDSCH using a modulation method notified by the downlink grant, such as quadrature phase shift keying (QPSK) modulation, 16-quadrature amplitude modulation (QAM), or 64QAM, and outputs the demodulated PDSCH to the decoding unit 1051. The decoding unit 1051 performs decoding on the basis of information about the coding rate notified by downlink control information and outputs the decoded downlink data (transport block) to the higher layer processing unit 101.

The channel measurement unit 1059 measures downlink path loss or a downlink channel state from the downlink reference signal which is input from the demultiplexing unit 1055 and outputs the measured downlink path loss or channel state to the higher layer processing unit 101. The channel measurement unit 1059 calculates the estimated value of the downlink channel from the downlink reference signal and outputs the estimated value to the demultiplexing unit 1055.

The transmitting unit 107 generates an uplink reference signal in response to the control signal input from the control unit 103, codes and modulates the uplink data (transport block) input from the higher layer processing unit 101, multiplxes the PUCCH, the PUSCH, and the generated uplink reference signal, and transmits the multiplexed signal to the base station device 3 through the transmitting/receiving antenna 109.

The coding unit 1071 performs coding, such as convolution cording or blocking coding, on the uplink control information input from the higher layer processing unit 101. In addition, the coding unit 1071 performs turbo cording on the basis of the information used to schedule the PUSCH.

The modulation unit 1073 modulates the coded bit which is input from the coding unit 1071 using the modulation method notified by the downlink control information, such as BPSK modulation, QPSK modulation, 16QAM, or 64QAM, or a modulation method which is predetermined for each channel. The modulation unit 1073 determines the number of spatial-multiplexed data sequences on the basis of the information used to schedule the PUSCH, maps a plurality of uplink data items, which are transmitted through the same PUSCH by multiple-input multiple-output spatial multiplexing (MIMO SM), into a plurality of sequences, and performs precoding on the sequences.

The uplink reference signal generation unit 1079 generates sequences which are calculated by a predetermined rule (expression), on the basis of, for example, a physical cell identifier (PCI which is also referred to as, for example, a cell ID) for identifying the base station device 3, the bandwidth of the uplink reference signal, a cyclic shift notified by the uplink grant, the values of parameters for the generation of a DMRS sequence. The multiplexing unit 1075 arranges the modulated symbols of the PUSCH in parallel and performs discrete Fourier transform (DFT), in response to the control signal input from the control unit 103. In addition, the multiplexing unit 1075 multiplexes the PUCCH, the signal of the PUSCH, and the generated uplink reference signal for each transmission antenna port. That is, the multiplexing unit 1075 maps the PUCCH, the signal of the PUSCH, and the generated uplink reference signal in the resource elements for each transmission antenna port.

The radio transmitting unit 1077 performs inverse fast Fourier transform (IFFT) on the multiplexed signal, performs SC-FDMA modulation on the signal, adds the guard interval to the SC-FDMA symbol subjected to SC-FDMA modulation to generate a baseband digital signal, converts the baseband digital signal into an analog signal, generates an in-phase component and a quadrature component of an intermediate-frequency signal from the analog signal, removes an extra frequency component from the intermediate frequency band, converts the signal with the intermediate frequency into a high-frequency signal (up conversion), removes an extra frequency component, performs power amplification, and outputs and transmits the signal to the transmitting/receiving antenna 109.

Figure 8:
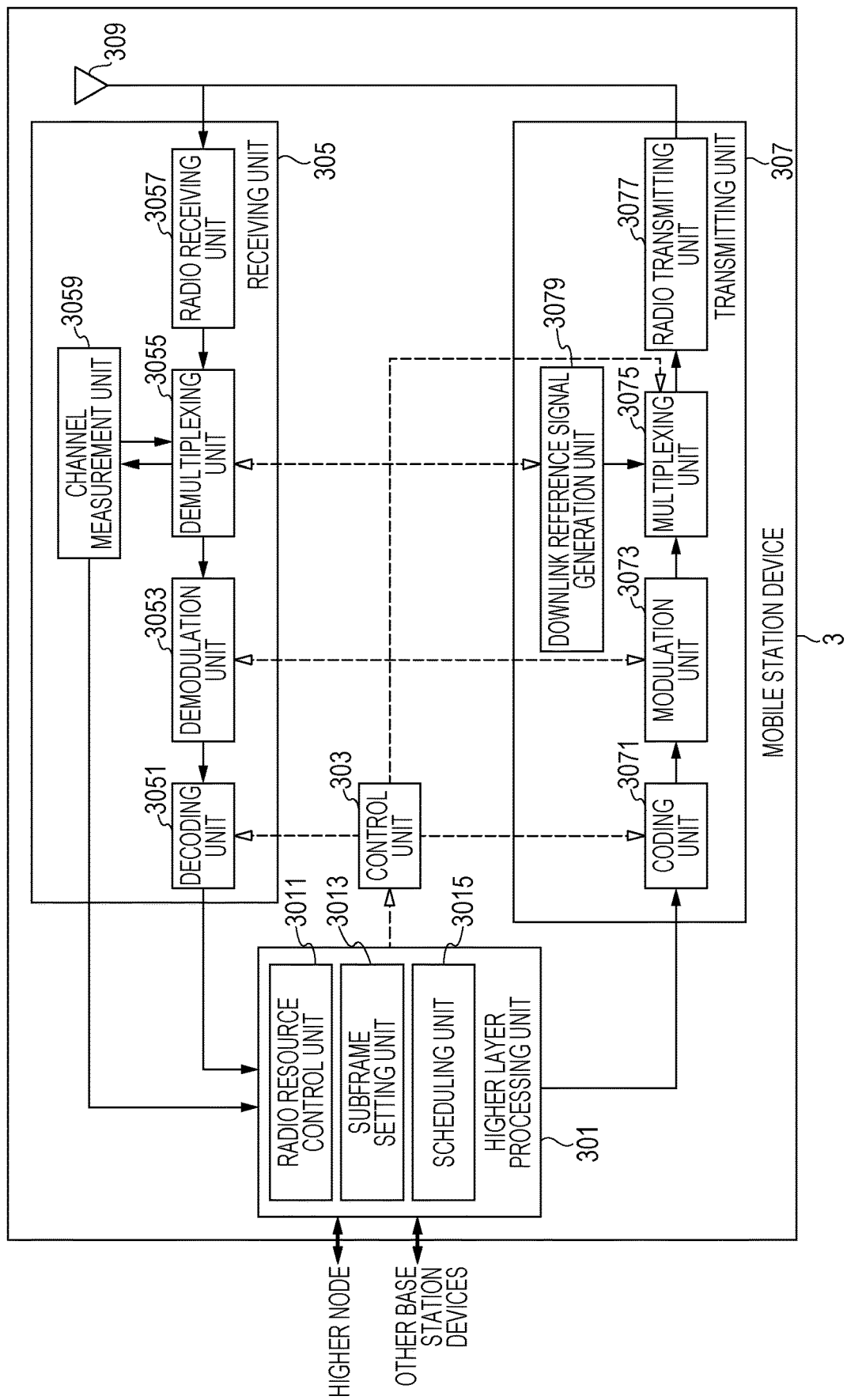
FIG. 8 is a schematic block diagram illustrating the structure of a base station device 3 according to this embodiment.

FIG. 8 is a schematic block diagram illustrating the structure of the base station device 3 according to this embodiment. As shown in FIG. 8, the base station device 3 includes a higher layer processing unit 301, a control unit 303, a receiving unit 305, a transmitting unit 307, and a transmitting/receiving antenna 309. The higher layer processing unit 301 includes a radio resource control unit 3011, a subframe setting unit 3013, and a scheduling unit 3015. The receiving unit 305 includes a decoding unit 3051, a demodulation unit 3053, a demultiplexing unit 3055, a radio receiving unit 3057, and a channel measurement unit 3059. The transmitting unit 307 includes a coding unit 3071, a modulation unit 3073, a multiplexing unit 3075, a radio transmitting unit 3077, and a downlink reference signal generation unit 3079.

The higher layer processing unit 301 processes a medium access control (MAC) layer, a packet data convergence protocol (PDCP) layer, a radio link control (RLC) layer, and a radio resource control (RRC) layer. In addition, the higher layer processing unit 301 generates control information for controlling the receiving unit 305 and the transmitting unit 307 and outputs the control information to the control unit 303.

The radio resource control unit 3011 of the higher layer processing unit 301 generates, for example, downlink data (transport block), system information, an RRC message, and a MAC control element (CE) to be mapped in downlink PDSCH or acquires a higher node and outputs the generated data or the acquired higher node to the transmitting unit 307. In addition, the radio resource control unit 3011 manages various kinds of setting information of the mobile station device 1.

The subframe setting unit 3013 of the higher layer processing unit 301 manages the first uplink reference UL-DL configuration, the first downlink reference UL-DL configuration, the second uplink reference UL-DL configuration, the second downlink reference UL-DL configuration, and the transmission direction UL-DL configuration for each mobile station device 1.

The subframe setting unit 3013 sets the first uplink reference UL-DL configuration, the first downlink reference UL-DL configuration, the second uplink reference UL-DL configuration, the second downlink reference UL-DL configuration, and the transmission direction UL-DL configuration to each mobile station device 1.

The subframe setting unit 3013 generates first information indicating the first uplink reference UL-DL configuration, second information indicating the first downlink reference UL-DL configuration, and third information indicating the transmission direction UL-DL configuration. The subframe setting unit 3013 transmits the first information, the second information, and the third information to the mobile station device 1 through the transmitting unit 307.

The base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration for the mobile station device 1. In addition, the base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration for the mobile station device 1 in response to instructions from a higher node.

For example, the subframe setting unit 3013 may determine the first uplink reference UL-DL configuration, the first downlink reference UL-DL configuration, the second uplink reference UL-DL configuration, the second downlink reference UL-DL configuration, and/or the transmission direction UL-DL configuration on the basis of the amount of uplink traffic and the amount of downlink traffic.

The scheduling unit 3015 of the higher layer processing unit 301 determines, for example, the frequency and subframe to which the physical channels (the PDSCH and the PUSCH) are allocated, the coding rate and modulation method of the physical channels (the PDSCH and the PUSCH), and transmission power from the estimated value of the propagation path or the quality of the channel which is input from the channel measurement unit 3059. The scheduling unit 3015 determines whether to schedule the downlink physical channel and/or the downlink physical signal or to schedule the uplink physical channel and/or the uplink physical signal in a flexible subframe. The scheduling unit 3015 generates control information (for example, a DCI format) for controlling the receiving unit 305 and the transmitting unit 307 on the basis of the scheduling result and outputs the control information to the control unit 303.

The scheduling unit 3015 generates information which is used to schedule the physical channels (the PDSCH and the PUSCH) on the basis of the scheduling result. In addition, the scheduling unit 3015 determines the time when the transmitting process and the receiving process are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The control unit 303 generates control signals for controlling the receiving unit 305 and the transmitting unit 307, on the basis of the control information from the higher layer processing unit 301. The control unit 303 outputs the generated control signals to the receiving unit 305 and the transmitting unit 307 to control the receiving unit 305 and the transmitting unit 307.

The receiving unit 305 performs demultiplexing, demodulation, and decoding on the signal which is received from the mobile station device 1 through the transmitting/receiving antenna 309, in response to the control signal input from the control unit 303 and outputs the decoded information to the higher layer processing unit 301. The radio receiving unit 3057 converts the uplink signal which is received through the transmitting/receiving antenna 309 into an intermediate-frequency signal (down conversion), removes an unnecessary frequency component, controls an amplification level such that a signal level is appropriately maintained, performs quadrature demodulation on the basis of an in-phase component and a quadrature component of the received signal, and converts the quadrature-demodulated analog signal into a digital signal.

The radio receiving unit 3057 removes a portion corresponding to the guard interval (GI) from the converted digital signal. The radio receiving unit 3057 performs fast Fourier transform (FFT) on the signal from which the guard interval has been removed, extracts a signal in the frequency domain, and outputs the extracted signal to the demultiplexing unit 3055.

The demultiplexing unit 1055 demultiplexes the signal input from the radio receiving unit 3057 into signals, such as the PUCCH, the PUSCH, and the uplink reference signal. The demultiplexing process is determined by the radio resource control unit 3011 of the base station device 3 in advance and is performed on the basis of the allocation information of the radio resources included in the uplink grant which is notified to each mobile station device 1. In addition, the demultiplexing unit 3055 compensates for the propagation paths of the PUCCH and the PUSCH from the estimated value of the propagation path input from the channel measurement unit 3059. The demultiplexing unit 3055 outputs the demultiplexed uplink reference signal to the channel measurement unit 3059.

The demodulation unit 3053 inverse discrete Fourier transform (IDFT) on the PUSCH, acquires modulated symbols, and demodulates the received signal using a modulation method which is predetermined for each of the modulated symbols of the PUCCH and the PUSCH, such as binary phase shift keying (BPSK) modulation, QPSK modulation, 16QAM, or 64QAM, or the modulation method which is notified from the host device to each mobile station device 1 with the uplink grant in advance. The demodulation unit 3053 demodulates the modulated symbols of a plurality of uplink data items which are transmitted through the same PUSCH by the MIMO SM, on the basis of the number of spatial-multiplexed sequences, which are notified to each mobile station device 1 by the uplink grant in advance, and information indicating precoding for the sequences.

The decoding unit 3051 decodes the coded bits of the demodulated PUCCH and PUSCH at a predetermined coding rate of a predetermined coding method or the coding rate of the predetermined coding method which is notified from the host device to the mobile station device 1 with the uplink grant in advance and outputs the decoded uplink data and the uplink control information to the higher layer processing unit 101. When the PUSCH is retransmitted, the decoding unit 3051 performs decoding using the coded bits, which have been input from the higher layer processing unit 301 and then stored in an HARQ buffer, and the demodulated coded bits. The channel measurement unit 309 measures, for example, the estimated value of the propagation path and the quality of the channel from the uplink reference signal which is input from the demultiplexing unit 3055 and outputs the measured values to the demultiplexing unit 3055 and the higher layer processing unit 301.

The transmitting unit 307 generates a downlink reference signal, performs coding and modulation on the HARQ indicator, downlink control information, and downlink data input from the higher layer processing unit 301, multiplexes the PHICH, the PDCCH, the EPDCCH, the PDSCH, and the downlink reference signal, and transmits the signals to the mobile station device 1 through the transmitting/receiving antenna 309, in response to the control signal input from the control unit 303.

The coding unit 3071 codes the HARQ indicator, downlink control information, and downlink data input from the higher layer processing unit 301 using a predetermined coding method, such as block coding, convolution coding, or turbo coding, or the coding method determined by the radio resource control unit 3011. The modulation unit 3073 modulates the coded bits input from the coding unit 3071 using a predetermined modulation method, such as BPSK modulation, QPSK modulation, 16QAM, or 64QAM, or the modulation method determined by the radio resource control unit 3011.

The downlink reference signal generation unit 3079 generates, as the downlink reference signal, the sequence which has been known to the mobile station device 1 and is calculated according to a predetermined rule on the basis of, for example, a physical cell identifier (PCI) for identifying the base station device 3. The multiplexing unit 3075 multiplexes the modulated symbol of each modulated channel and the generated downlink reference signal. That is, the multiplexing unit 3075 maps the modulated symbol of each modulated channel and the generated downlink reference signal in the resource elements.

The radio transmitting unit 3077 performs inverse fast Fourier transform (IFFT) on, for example, the multiplexed modulated symbols, performs OFDM modulation, adds the guard interval to the OFDM symbol subjected to the OFDM modulation, generates a baseband digital signal, converts the baseband digital signal into an analog signal, generates an in-phase component and a quadrature component of an intermediate-frequency signal from the analog signal, removes an extra frequency component in the intermediate frequency band converts the intermediate-frequency signal into a high-frequency signal (up conversion), removes an extra frequency component, performs power amplification, and outputs and transmits the signal to the transmitting/receiving antenna 309.

Next, the first uplink reference uplink-downlink configuration (uplink reference UL-DL configuration), the first downlink reference uplink-downlink configuration (downlink reference UL-DL configuration), the second uplink reference UL-DL configuration, the second downlink reference UL-DL configuration, and the transmission direction uplink-downlink configuration (transmission direction UL-DL configuration) will be described.

The first uplink reference UL-DL configuration, the first downlink reference UL-DL configuration, the second uplink reference UL-DL configuration, the second downlink reference UL-DL configuration, and the transmission direction UL-DL configuration are defined by uplink-downlink configuration (UL-DL configuration).

The uplink-downlink configuration is configuration related to the pattern of the subframes in the radio frame. That is, the first uplink reference UL-DL configuration, the second uplink reference UL-DL configuration, the first downlink reference UL-DL configuration, the second downlink reference UL-DL configuration, and the transmission direction UL-DL configuration are defined by the pattern of the downlink subframes, the uplink subframes, and the special subframes in the radio frame.

FIG. 9 is a table illustrating an example of the uplink-downlink configuration according to this embodiment. In FIG. 9, D indicates the downlink subframe, U indicates the uplink subframe, and S indicates the special subframe.

In FIG. 9, subframe 1 in the radio frame is constantly the special subframe. In FIG. 9, subframes 0 and 5 are constantly reserved for downlink transmission and subframe 1 is constantly reversed for uplink transmission.

In FIG. 9, when the downlink-uplink switch-point periodicity is 5 ms, subframe 6 in the radio frame is the special subframe. When the downlink-uplink switch-point periodicity is 10 ms, subframe 6 in the radio frame is the downlink subframe.

The first uplink reference UL-DL configuration is also referred to as a first parameter, a first configuration, or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

The setting of uplink-downlink configuration i as the first or second uplink reference UL-DL configuration is referred to the setting of first or second uplink reference UL-DL configuration i. The setting of uplink-downlink configuration i as the first or second downlink reference UL-DL configuration is referred to as the setting of first or second downlink reference UL-DL configuration i. The setting of uplink-downlink configuration i as the transmission direction UL-DL configuration is referred to as the setting of transmission direction UL-DL configuration i.

Next, a method for setting the first uplink reference UL-DL configuration, the first downlink reference UL-DL configuration, and the transmission direction UL-DL configuration will be described.

The base station device 3 sets the first uplink reference UL-DL configuration, the first downlink UL-DL configuration, and the transmission direction UL-DL configuration. The base station device 3 may insert first information (TDD-Con fig) indicating the first uplink reference UL-DL configuration, second information indicating the first downlink reference UL-DL configuration, and third information indicating the transmission direction UL-DL configuration into at least one of an MIB, a system information block type 1 message, a system information message, an RRC message, a MAC control element (CE), and physical layer control information (for example, a DCI format) and transmit the information items. In addition, the base station device 3 may insert the first information, the second information, and the third information into any one of the MIB, the system information block type 1 message, the system information message, the RRC message, the MAC control element (CE), and the physical layer control information (for example, a DCI format), depending on the situation.

The first uplink reference UL-DL configuration, the second uplink reference UL-DL configuration, the first downlink reference UL-DL configuration, the second downlink reference UL-DL configuration, and the transmission direction UL-DL configuration may be defined for each of a plurality of serving cells.

The base station device 3 transmits the first information, the second information, and the third information for each serving cell to the mobile station device 1 to which the plurality of serving cells are set. However, the first information, the second information, and the third information may be defined for each serving cell.

The base station device 3 may transmit first information on a primary cell, second information on the primary cell, third information on the primary cell, first information on a secondary cell, second information on the secondary cell, and third information on the secondary cell to the mobile station device 1 to which two serving cells, that is, one primary cell and one secondary cell are set.

The mobile station device 1 to which a plurality of serving cells are set may set the first uplink reference UL-DL configuration, the first downlink reference UL-DL configuration, and the transmission direction DL-UL configuration to each serving cell on the basis of the first information, the second information, and the third information.

The mobile station device 1 to which two serving cells, that is, one primary cell and one secondary cell are set may set the first uplink reference UL-DL configuration for the primary cell, the first downlink reference UL-DL configuration for the primary cell, the transmission direction DL-UL configuration for the primary cell, the first uplink reference UL-DL configuration for the secondary cell, the first downlink reference UL-DL configuration for the secondary cell, and the transmission direction DL-UL configuration for the secondary cell.

It is preferable that the first information on the primary cell be included in the system information block type 1 message or the RRC message. It is preferable that the first information on the secondary cell be included in the RRC message. It is preferable that the second information on the primary cell be included in the system information block type 1 message, the system information message, or the RRC message. It is preferable that the second information on the secondary cell be included in the RRC message. It is preferable that the third information be included in the MIB, the MAC CE, or the physical layer control information (for example, a DCI format).

It is preferable that the first information be common to a plurality of mobile station devices 1 in the cell. The second information may be common to the plurality of mobile station devices 1 in the cell or it may be dedicated for a mobile station device 1. The third information may be common to the plurality of mobile station devices 1 in the cell or it may be used only for a mobile station device 1.

The second information may be transmitted together with the first information. The mobile station device 1 to which the first downlink reference UL-DL configuration is not set on the basis of the second information may not receive the third information.

It is preferable that the change cycle of the transmission direction UL-DL configuration be shorter than that of the downlink reference UL-DL configuration. It is preferable that the frequency of change in the transmission direction UL-DL configuration be less than the frequency of change in the downlink reference UL-DL configuration. It is preferable that the change cycle of the downlink reference UL-DL configuration be shorter than that of the uplink reference UL-DL configuration. It is preferable that the frequency of change in the downlink reference UL-DL configuration be less than the frequency of change in the uplink reference UL-DL configuration.

The system information block type 1 message is transmitted through the PDSCH in subframe 5 of the radio frame which satisfies SFN mod 2=0. The system information block type 1 message includes information indicating the structure of the special subframe (the length of the DwPTS, the GP, and the UpPTS). The system information block type 1 message is information unique to the cell.

The system information message is transmitted through the PDSCH. The system information message is information unique to the cell. The system information message includes system information block X in addition to system information block type 1.

The RRC message is transmitted through the PDSCH. The RRC message is information/signal which is processed in the RRC layer. The RRC message may be common to a plurality of mobile station devices 1 in the cell or it may be used only for a specific mobile station device 1.

The MAC CE is transmitted through the PDSCH. The MAC CE is information/signal which is processed in the MAC layer.

When receiving the RRC message including the first information and/or the second information and/or the third information through the PDSCH, it is preferable that the mobile station device 1 set (validate) the first uplink reference UL-DL configuration and/or the first downlink reference UL-DL configuration and/or the transmission direction UL-DL configuration in the subframe (timing) in which transmits an RRC connection reconfiguration complete message corresponding to the RRC message is transmitted.

When receiving the MIB including the first information and/or the second information and/or third information through PBCH in subframe n-k, it is preferable that the mobile station device 1 set (validate) the first uplink reference UL-DL configuration/the first downlink reference UL-DL configuration and/or the transmission direction UL-DL configuration in subframe n. For example, k is 4 or 8. For example, k is determined on the basis of the table shown in FIG. 21 and the current first or second downlink reference UL-DL configuration. FIG. 21 will be described below.

When receiving the MAC CE including the first information and/or the second information and/or the third information through the PDSCH in subframe n-k, the mobile station device 1 set (validate) the first uplink reference UL-DL configuration and/or the first downlink reference UL-DL configuration and/or the transmission direction UL-DL configuration in subframe n. For example, k is 4 or 8. For example, subframe n+k is used to transmit the HARQ-ACK (ACK) for the PDSCH which is used to transmit the MAC CE. For example, k is determined on the basis of the table shown in FIG. 21 and the current first or second downlink reference UL-DL configuration.

When receiving the physical layer control information (for example, a DCI format) including the first information and/or the second information and/or third information through the downlink physical channel (for example, PDCCH/EPDCCH) in subframe n-k, it is preferable that the mobile station device 1 set (validate) the first uplink reference UL-DL configuration and/or the first downlink reference UL-DL configuration and/or the transmission direction UL-DL configuration in subframe n. For example, k is 4 or 8. For example, subframe n+k is used to transmit the HARQ-ACK (ACK) for the downlink physical channel (for example, PDCCH/EPDCCH) which is used to transmit the physical layer control information (for example, a DCI format). For example, k is determined on the basis of the table shown in FIG. 21 and the current first or second downlink reference UL-DL configuration.

The mobile station device 1 which receives first information on a given serving cell and does not receive second information on the given serving cell and the base station device 3 which transmits first information on a given serving cell and does not transmit second information on the given serving cell may set the first downlink reference UL-DL configuration to the given serving cell on the basis of the first information on the given serving cell. The mobile station device 1 may ignore third information on the serving cell to which the first downlink reference UL-DL configuration is set on the basis of the first information.

Figure 10:
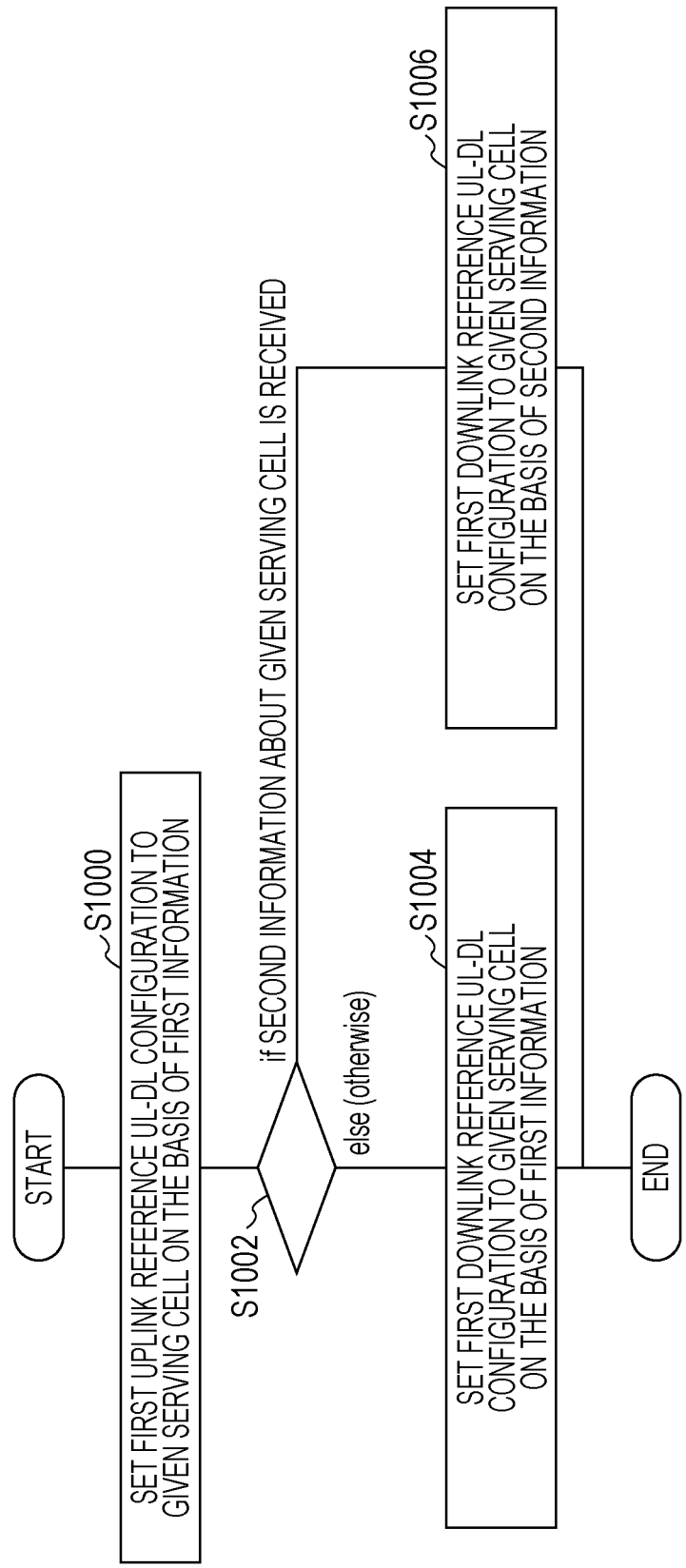
FIG. 10 is a flowchart illustrating a method for setting a first uplink reference UL-DL configuration and a first downlink reference UL-DL configuration in this embodiment.

FIG. 10 is a flowchart illustrating a method for setting the first uplink reference UL-DL configuration and the first downlink reference UL-DL configuration in this embodiment. The mobile station device 1 performs the setting method shown in FIG. 10 for each of a plurality of serving cells.

The mobile station device 1 sets the first uplink reference UL-DL configuration to a given serving cell on the basis of the first information (S1000). The mobile station device 1 determines whether the second information on the given serving cell is received (S1002). When the second information on the given serving cell is received, the mobile station device 1 sets the first downlink reference UL-DL configuration to the given serving cell on the basis of the second information on the given serving cell (S1006). When the second information on the given serving cell is not received (else/otherwise), the mobile station device 1 sets the first downlink reference UL-DL configuration to the given serving cell on the basis of the first information on the given serving cell (S1006).

The serving cell to which the first uplink reference UL-DL configuration and the first downlink reference UL-DL configuration are set on the basis of the first information is referred to as a serving cell to which a dynamic TDD is not set. The serving cell to which the first downlink reference UL-DL configuration is set on the basis of the second information is referred to as a serving cell to which the dynamic TDD is not set.

When the first downlink reference UL-DL configuration for the serving cell to which the transmission direction UL-DL configuration is set is reset, the mobile station device 1 may clear/discard the transmission direction UL-DL configuration for the serving cell.

When the first downlink reference UL-DL configuration reset to the serving cell to which the transmission direction UL-DL configuration is set is the same as the previous first downlink reference UL-DL configuration, the mobile station device 1 may clear/discard the transmission direction UL-DL configuration for the serving cell. That is, when the first downlink reference UL-DL configuration for the serving cell to which the transmission direction UL-DL configuration is set is changed, the mobile station device 1 may clear/discard the transmission direction UL-DL configuration for the serving cell.

When the base station device 3 instructs the mobile station device 1 to reset/change the first downlink reference UL-DL configuration for the serving cell to which the transmission direction UL-DL configuration is set, it may be considered that the transmission direction UL-DL configuration for the serving cell is cleared/discarded by the mobile station device 1.

When the first uplink reference UL-DL configuration for the serving cell to which the first downlink reference UL-DL configuration and the transmission direction UL-DL configuration are set is reset, the mobile station device 1 may clear/discard the first downlink reference UL-DL configuration and the transmission direction UL-DL configuration.

When the base station device 3 instructs the mobile station device 1 to reset/change the first uplink reference UL-DL configuration for the serving cell to which the first downlink reference UL-DL configuration and the transmission direction UL-DL configuration are set, it may be considered that the first downlink reference UL-DL configuration and the transmission direction UL-DL configuration for the serving cell are cleared/discarded by the mobile station device 1.

The mobile station device 1 receives the second information and determines the subframe which can transmit the uplink signal on the basis of the second information. Then, the mobile station device 1 monitors whether the third information is received. When the third information is received, the mobile station device 1 determines the subframe which can transmit the uplink signal, on the basis of the third information.

For example, the base station device 3 transmits the third information to the mobile station device 1, using the PDCCH/EPDCCH. The third information is used to control the operation of the dynamic TDD in the coverage of the base station device 3 (cell). The third information is transmitted and received in a common search space (CSS) or a UE-specific search space (USS).

The CSS is a region which is shared by a plurality of mobile station devices 1 and in which the PDCCH/EPDCCH is monitored. The USS is a region which is defined on the basis of at least C-RNTI. The C-RNTI is an identifier which is uniquely allocated to the mobile station device 1.

Preferably, the C-RNTI is not used, but a common identifier is used as the PDCCH/EPDCCH which is used to transmit and receive the third information. The subframe in which the mobile station device 1 monitors the PDCCH/EPDCCH including the third information may be limited. The base station device 3 may control the subframe in which the mobile station device 1 monitors the PDCCH/EPDCCH including the third information.

For example, the PDCCH/EPDCCH including the third information is allocated at an interval of 10 subframes. For example, the mobile station device 1 monitors the third information at an interval of 10 subframes. The subframe in which the PDCCH/EPDCCH including the third information is allocated may be predetermined. For example, the third information may be mapped only in subframe 0 of the radio frame.

The base station device 3 transmits the third information only when determining that the transmission of the third information is needed. For example, when determining to change the transmission direction UL-DL configuration, the base station device 3 transmits the third information. For example, the base station device 3 determines the third information to the mobile station device 1 which has started the dynamic TDD operation when determining that the notification of the third information is needed.

The mobile station device 1 which has started the dynamic TDD operation monitors the PDCCH/EPDCCH including the third information in the subframe in which the PDCCH/EPDCCH including the third information is allocated.

The mobile station device 1 tries to decode the received signal and determines whether the PDCCH/EPDCCH including the third information is detected. When the PDCCH/EPDCCH including the third information is detected, the mobile station device 1 determines the subframe which can transmit the uplink signal, on the basis of the detected third information. When the PDCCH/EPDCCH including the third information is not detected, the mobile station device 1 may maintain the determined subframe which can transmit the uplink signal.

Next, a method for setting the second uplink reference UL-DL configuration will be described.

When a plurality of serving cells are set to the mobile station device 1 and the first uplink reference UL-DL configurations for at least two serving cells are different from each other, the mobile station device 1 and the base station device 3 set the second uplink reference UL-DL configuration.

In a case other than a case that a plurality of serving cells are set to the mobile station device 1 and the first uplink reference UL-DL configurations for at least two serving cells are different from each other, the mobile station device 1 and the base station device 3 may not set the second uplink reference UL-DL configuration.

In some cases, the first uplink reference UL-DL configuration is the same for all serving cells except when the first uplink reference UL-DL configurations for at least two serving cells are different from each other. When one serving cell is set to the mobile station device 1, the mobile station device 1 and the base station device 3 may not set the second uplink reference UL-DL configuration.

Figure 11:
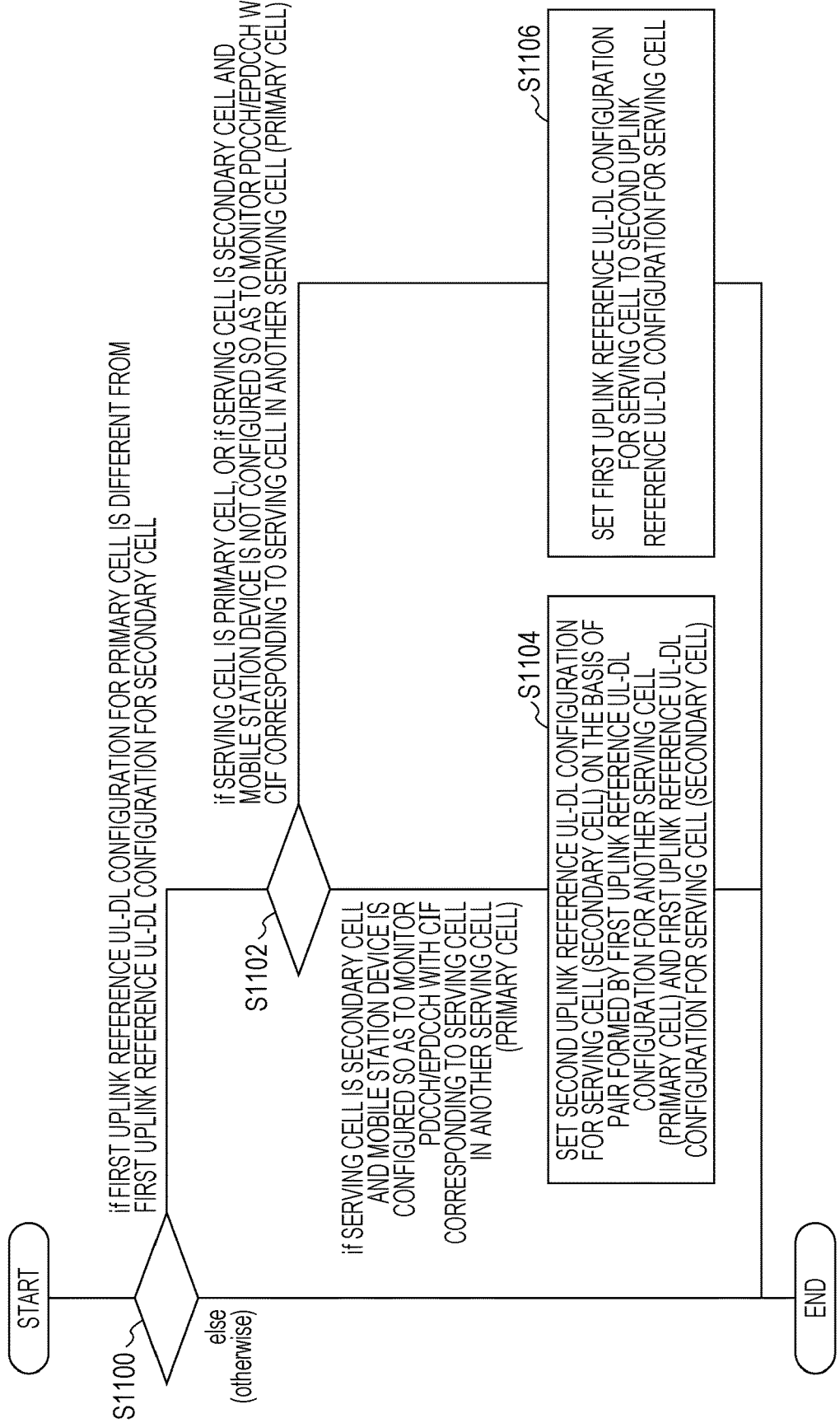
FIG. 11 is a flowchart illustrating a method for setting a second uplink reference UL-DL configuration in this embodiment.

FIG. 11 is a flowchart illustrating a method for setting the second uplink reference UL-DL configuration in this embodiment. In FIG. 11, one primary cell and one secondary cell are set to the mobile station device 1. The mobile station device 1 performs the setting method shown in FIG. 11 for each of the primary cell and the secondary cell.

The mobile station device 1 determines whether the first uplink reference UL-DL configuration for the primary cell is different from the first uplink reference UL-DL configuration for the secondary cell (S1100). When the first uplink reference UL-DL configuration for the primary cell is the same as the first uplink reference UL-DL configuration for the secondary cell, the mobile station device 1 does not set the second uplink reference UL-DL configuration and ends the process of setting the second uplink reference UL-DL configuration.

When the first uplink reference UL-DL configuration for the primary cell is different from the first uplink reference UL-DL configuration for the secondary cell, the mobile station device 1 determines whether the serving cell is the primary cell or the secondary cell and/or whether the mobile station device 1 is configured so as to monitor the PDCCH/EPDCCH with a carrier indicator field (CIF) corresponding to the serving cell in the other serving cell (S1102).

When the serving cell is the secondary cell and the mobile station device 1 is configured so as to monitor the PDCCH/EPDCCH with the CIF corresponding to the serving cell (secondary cell) in the other serving cell (primary cell), the mobile station device 1 sets the second uplink reference UL-DL configuration for the serving cell (secondary cell) on the basis of a pair which is formed by the first uplink reference UL-DL configuration for the other serving cell (primary cell) and the first uplink reference UL-DL configuration for the serving cell (secondary cell) (S1104).

In S1104, the mobile station device 1 sets the second uplink reference UL-DL configuration for the serving cell (secondary cell) on the basis of the table shown in FIG. 12. FIG. 12 is a diagram illustrating the correspondence between the pair which is formed by the first uplink reference UL-DL configuration for the other serving cell (primary cell) and the first uplink reference UL-DL configuration for the serving cell (secondary cell) and the second uplink reference UL-DL configuration for the secondary cell in this embodiment.

In FIG. 12, the primary cell UL-DL configuration refers to the first uplink reference UL-DL configuration for the other serving cell (primary cell). In FIG. 12, the secondary cell UL-DL configuration refers to the first uplink reference UL-DL configuration for the serving cell (secondary cell).

For example, when first uplink reference UL-DL configuration 0 is set to the other serving cell (primary cell) and first uplink reference UL-DL configuration 2 is set to the serving cell (secondary cell), second uplink reference UL-DL configuration 1 is set to the secondary cell.

When the serving cell is the primary cell or the serving cell is the secondary cell and the mobile station device 1 is not configured so as to monitor the PDCCH/EPDCCH with the CIF corresponding to the serving cell (secondary cell) in the other serving cell (primary cell), the first uplink reference UL-DL configuration for the serving cell is set to the second uplink reference UL-DL configuration for the serving cell (S1106).

The base station device 3 sets the second uplink reference UL-DL configuration on the basis of the setting method shown in FIG. 11.

The monitoring of the PDCCH/EPDCCH with the CIF means that the mobile station device 1 attempts to decode the PDCCH or the EPDCCH according to the DCI format including the CIF. The CIF is a field to which a carrier indicator is mapped. The value of the carrier indicator indicates the serving cell corresponding to the DCI format related to the carrier indicator.

The mobile station device 1 which is configured so as to monitor the PDCCH/EPDCCH with the CIF corresponding to the serving cell in the other serving cell monitors the PDCCH/EPDCCH with the CIF in the other serving cell.

It is preferable that the mobile station device 1 which is configured so as to monitor the PDCCH/EPDCCH with the CIF corresponding to the serving cell in the other serving cell receive the third information on the serving cell through the PDCCH/EPDCCH in the other serving cell.

The mobile station device 1 which is not configured so as to monitor the PDCCH/EPDCCH with the CIF corresponding to the serving cell in the other serving cell monitors the PDCCH/EPDCCH with the CIF or the PDCCH/EPDCCH without the CIF in the serving cell.

It is preferable that the mobile station device 1 which is not configured so as to monitor the PDCCH/EPDCCH with the CIF corresponding to the serving cell in the other serving cell receive the third information on the serving cell through the PDCCH/EPDCCH in the serving cell.

The PDCCH/EPDCCH for the primary cell is transmitted in the primary cell. It is preferable that the third information on the primary cell be transmitted through the PDCCH/EPDCCH of the primary cell.

Next, a method for setting the second downlink reference UL-DL configuration will be described.

When a plurality of serving cells are set to the mobile station device 1 and the first downlink reference UL-DL configurations for at least two serving cells are different from each other, the mobile station device 1 and the base station device 3 set the second downlink reference UL-DL configuration. The mobile station device 1 and base station device 3 may not set the second downlink reference UL-DL configuration, except when a plurality of serving cells are set to the mobile station device 1 and the first downlink reference UL-DL configurations for at least two serving cells are different from each other.

In some cases, the first downlink reference UL-DL configuration is the same for all serving cells, except when the first downlink reference UL-DL configurations for at least two serving cells are different from each other. When one serving cell is set to the mobile station device 1, the mobile station device 1 and the base station device 3 may not set the second downlink reference UL-DL configuration.

Figure 13:
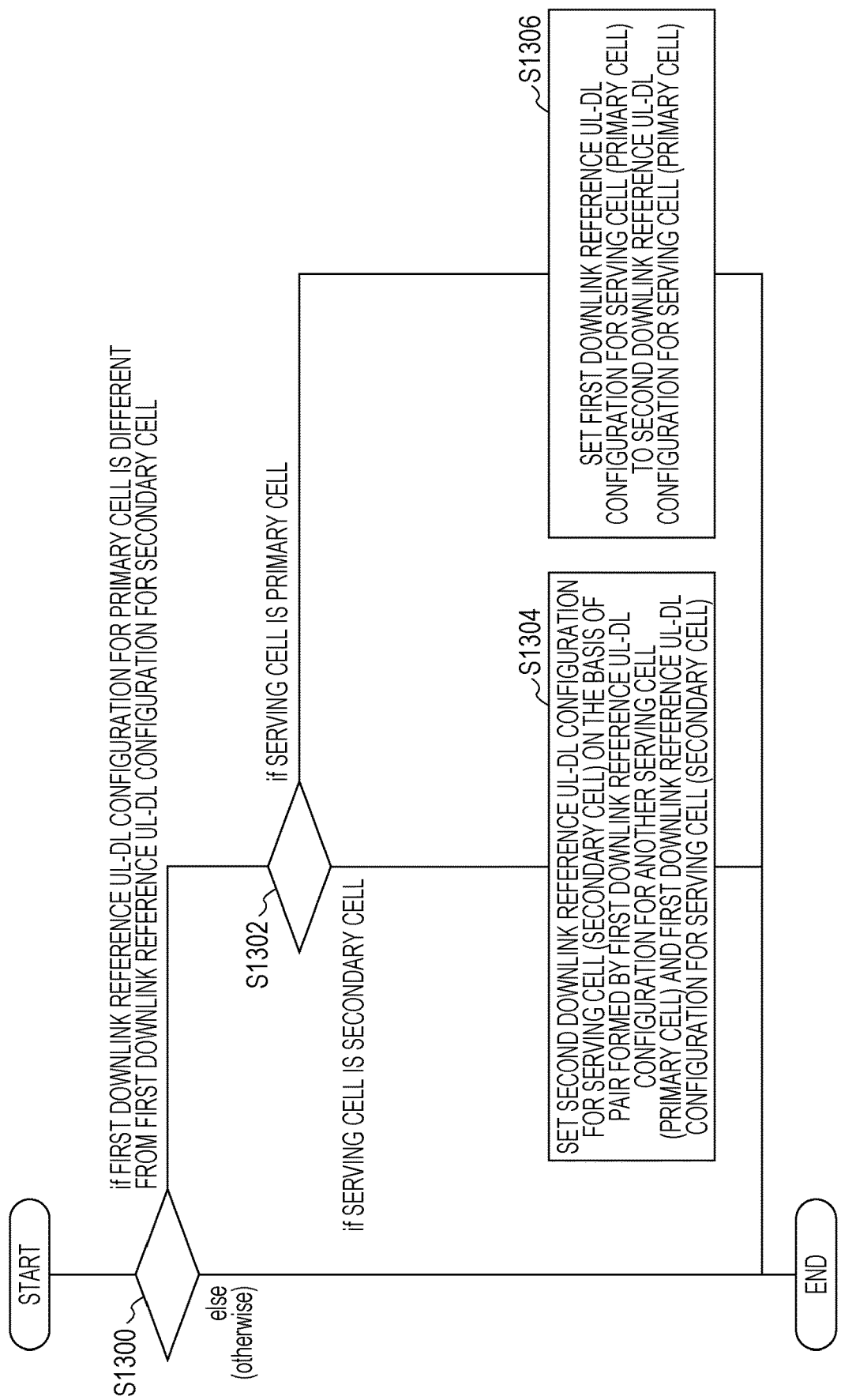
FIG. 13 is a flowchart illustrating a method for setting a second downlink reference UL-DL configuration in this embodiment.

FIG. 13 is a flowchart illustrating a method for setting the second downlink reference UL-DL configuration in this embodiment. In FIG. 13, one primary cell and one secondary cell are set to the mobile station device 1. The mobile station device 1 performs the setting method shown in FIG. 13 for each of the primary cell and the secondary cell.

The mobile station device 1 determines whether the first downlink reference UL-DL configuration for the primary cell is different from the first downlink reference UL-DL configuration for the secondary cell (S1300). When the first downlink reference UL-DL configuration for the primary cell is the same as the first downlink reference UL-DL configuration for the secondary cell, the mobile station device 1 does not set the second downlink reference UL-DL configuration and ends the process of setting the second downlink reference UL-DL configuration.

When the first downlink reference UL-DL configuration for the primary cell is different from the first downlink reference UL-DL configuration for the secondary cell, the mobile station device 1 determines whether the serving cell is the primary cell or the secondary cell (S1302).

When the serving cell is the secondary cell, the mobile station device 1 sets the second uplink reference UL-DL configuration for the serving cell (secondary cell) on the basis of a pair which is formed by the first downlink reference UL-DL configuration for the other serving cell (primary cell) and the first downlink reference UL-DL configuration for the serving cell (secondary cell) (S1304).

In S1104, the mobile station device 1 sets the second downlink reference UL-DL configuration for the serving cell (secondary cell) on the basis of the table shown in FIG. 14. FIG. 14 is a diagram illustrating the correspondence between the pair which is formed by the first downlink reference UL-DL configuration for the primary cell and the first downlink reference UL-DL configuration for the secondary cell and the second downlink reference UL-DL configuration for the secondary cell in this embodiment.

In FIG. 14, the primary cell UL-DL configuration refers to the first downlink reference UL-DL configuration for the primary cell. In FIG. 14, the secondary cell UL-DL configuration refers to the first downlink reference UL-DL configuration for the secondary cell.

When the pair which is formed by the first downlink reference UL-DL configuration for the primary cell and the first downlink reference UL-DL configuration for the secondary cell belongs to set 1 in FIG. 14, the second downlink reference UL-DL configuration for the secondary cell is defined in set 1.

When the mobile station device 1 is not configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to set 2 in FIG. 14, the second downlink reference UL-DL configuration for the secondary cell is defined in set 2.

When the mobile station device 1 is not configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to set 3 in FIG. 14, the second downlink reference UL-DL configuration for the secondary cell is defined in set 3.

When the mobile station device 1 is configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to set 4 in FIG. 14, the second downlink reference UL-DL configuration for the secondary cell is defined in set 4.

When the mobile station device 1 is configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to set 5 in FIG. 14, the second downlink reference UL-DL configuration for the secondary cell is defined in set 5.

For example, when first downlink reference UL-DL configuration 1 is set to the primary cell and first downlink reference UL-DL configuration 0 is set to the secondary cell, second downlink reference UL-DL configuration 1 is set to the secondary cell.

When the serving cell is the primary cell, the first downlink reference UL-DL configuration for the serving cell (primary cell) is set to the second downlink reference UL-DL configuration for the serving cell (primary cell) (S1306).

The base station device 3 also sets the second downlink reference UL-DL configuration on the basis of the setting method shown in FIG. 13.

Next, the first uplink reference UL-DL configuration will be described.

The first uplink reference UL-DL configuration is at least used to specify the subframe which is capable or incapable of performing uplink transmission in the serving cell.

The mobile station device 1 does not perform uplink transmission in the subframe which is indicated as the downlink subframe by the first uplink reference UL-DL configuration. The mobile station device 1 does not perform uplink transmission in the DwPTS and GP of the subframe which is indicated as the special subframe by the first uplink reference UL-DL configuration.

Next, the first downlink reference UL-DL configuration will be described.

The first downlink reference UL-DL configuration is at least used to specify the subframe which is capable or incapable of performing downlink transmission in the serving cell.

The mobile station device 1 does not perform downlink transmission in the subframe which is indicated as the uplink subframe by the first downlink reference UL-DL configuration. The mobile station device 1 does not perform downlink transmission in the UpPTS and GP of the subframe which is indicated as the special subframe by the first downlink reference UL-DL configuration.

The mobile station device 1 which sets the first downlink reference UL-DL configuration on the basis of the first information may perform measurement using the downlink signal (for example, the measurement of the channel state information) in the DwPTS of the special subframe or the downlink subframe which is indicated by the first uplink reference UL-DL configuration or the first downlink reference UL-DL configuration.

Therefore, in the dynamic TDD, when the base station device 3 uses the subframe which is indicated as the downlink subframe by the first uplink reference UL-DL configuration as the special subframe or the uplink subframe or when the base station device 3 uses the subframe which is indicated as the special subframe by the first uplink reference UL-DL configuration as the uplink subframe, there is a problem that it is difficult for the mobile station device 1, which sets the first downlink reference UL-DL configuration on the basis of the first information, to appropriately perform the measurement using the downlink signal.

Therefore, the base station device 3 determines the downlink reference UL-DL configuration from a configuration set (the setting of the set) which is limited on the basis of the first uplink reference UL-DL configuration. That is, the first downlink reference UL-DL configuration is an element in the configuration set which is limited on the basis of the first uplink reference UL-DL configuration. The configuration set which is limited on the basis of the first uplink reference UL-DL configuration includes uplink-downlink configurations satisfying the following conditions (a) to (c). FIG. 15 is a diagram illustrating the subframe indicated by the first uplink reference UL-DL configuration and the subframe indicated by the first downlink reference UL-DL configuration in this embodiment. In FIG. 15, D indicates the downlink subframe, U indicates the uplink subframe, and S indicates the special subframe.

(a) The subframe which is indicated as the downlink subframe by the first uplink reference UL-DL configuration is indicated as the downlink subframe.

(b) The subframe which is indicated as the uplink subframe by the first uplink reference UL-DL configuration is indicated as the uplink subframe or the downlink subframe.

(c) The subframe which is indicated as the special subframe by the first uplink reference UL-DL configuration is indicated as the downlink subframe or the special subframe.

Therefore, in the dynamic TDD, since the subframe which is indicated as the downlink subframe by the first uplink reference UL-DL configuration and the DwPTS of the special subframe are not used for uplink transmission, the mobile station device 1 which sets the first downlink reference UL-DL configuration on the basis of the first information can appropriately perform measurement using the downlink signal.

In addition, the mobile station device 1 which sets the first downlink reference UL-DL configuration on the basis of the second information may perform measurement (for example, the measurement of the channel state information) using the downlink signal in the DwPTS of the special subframe or the downlink subframe which is indicated by the first uplink reference UL-DL configuration.

The subframe which is indicated as the uplink subframe by the first uplink reference UL-DL configuration and is indicated as the downlink subframe by the first downlink reference UL-DL configuration is also referred to as a first flexible subframe. The first flexible subframe is a subframe which is reserved for uplink and downlink transmission.

The subframe which is indicated as the special subframe by the first uplink reference UL-DL configuration and is indicated as the downlink subframe by the first downlink reference UL-DL configuration is also referred to as a second flexible subframe. The second flexible subframe is a subframe which is reserved for downlink transmission. The second flexible subframe is a subframe which is reserved for downlink transmission in the DwPTS and uplink transmission in the UpPTS.

Next, the transmission direction UL-DL configuration will be described in detail.

When the mobile station device 1 determines a transmission direction (downward/upward) on the basis of the first uplink reference UL-DL configuration, the first downlink reference UL-DL configuration, and the scheduling information (the DCI format and/or the HARQ-ACK), there is a problem that, in the subframe in which the base station device 3 transmits the downlink signal to another mobile station device 1, the mobile station device 1 which has erroneously received/decoded the scheduling information (the DCI format and/or the HARQ-ACK) transmits the uplink signal and the uplink signal interferes with the downlink signal.

Therefore, the mobile station device 1 and the base station device 3 according to the invention set the transmission direction UL-DL configuration for the transmission direction (downward/upward) in the subframe. The transmission direction UL-DL configuration is used to determine the transmission direction in the subframe.

The mobile station device 1 controls transmission in the first flexible subframe and the second flexible subframe, on the basis of the scheduling information (the DCI format and/or the HARQ-ACK) and the transmission direction UL-DL configuration.

The base station device 3 transmits the third information indicating the transmission direction UL-DL configuration to the mobile station device 1. The third information is information indicating the subframe which can perform uplink transmission. The third information is information indicating the subframe which can perform downlink transmission. The third information is information indicating the subframe which can perform uplink transmission in the UpPTS and can perform downlink transmission in the DwPTS.

For example, the transmission direction UL-DL configuration is used to specify the transmission direction in the subframe which is indicated as the uplink subframe by the first uplink reference UL-DL configuration and is indicated as the downlink subframe by the first downlink reference UL-DL configuration and/or the subframe which is indicated as the special subframe by the first uplink reference UL-DL configuration and is indicated as the downlink subframe by the first downlink reference UL-DL configuration. That is, the transmission direction UL-DL configuration is used to specify the transmission direction in the subframes which are indicated as different subframes by the first uplink reference UL-DL configuration and the first downlink reference UL-DL configuration.

FIG. 16 is a diagram illustrating the relationship among the subframe which is indicated by the first uplink reference UL-DL configuration, the subframe which is indicated by the first downlink reference UL-DL configuration, and the subframe which is indicated by the transmission direction UL-DL configuration in this embodiment. In FIG. 16, D indicates the downlink subframe, U indicates the uplink subframe, and S indicates the special subframe.

The base station device 3 determines the transmission direction UL-DL configuration from a configuration set (the setting of the set) which is limited on the basis of the first uplink reference UL-DL configuration and the first downlink reference UL-DL configuration. That is, the transmission direction UL-DL configuration is an element in the configuration set which is limited on the basis of the first uplink reference UL-DL configuration and the first downlink reference UL-DL configuration. The configuration set which is limited on the basis of the first uplink reference UL-DL configuration and the first downlink reference UL-DL configuration includes uplink-downlink configurations satisfying the following conditions (d) to (h).

(d) The subframe which is indicated as the downlink subframe by the first uplink reference UL-DL configuration and the first downlink reference UL-DL configuration is indicated as the downlink subframe.

(e) The subframe which is indicated as the uplink subframe by the first uplink reference UL-DL configuration and the first downlink reference UL-DL configuration is indicated as the uplink subframe.

(f) The subframe which is indicated as the uplink subframe by the first uplink reference UL-DL configuration and is indicated as the downlink subframe by the first downlink reference UL-DL configuration is indicated as the uplink subframe or the downlink subframe.

(g) The subframe which is indicated as the special subframe by the first uplink reference UL-DL configuration and the first downlink reference UL-DL configuration is indicated as the special subframe.

(h) The subframe which is indicated as the special subframe by the first uplink reference UL-DL configuration and is indicated as the downlink subframe by the first downlink reference UL-DL configuration is indicated as the special subframe or the downlink subframe.

The base station device 3 may schedule downlink transmission in the subframe which is indicated as the downlink subframe by the transmission direction UL-DL configuration.

The mobile station device 1 may performs a downlink signal receiving process in the subframe which is indicated as the downlink subframe by the transmission direction UL-DL configuration. The mobile station device 1 may monitor the PDCCH/EPDCCH in the subframe which is indicated as the downlink subframe by the transmission direction UL-DL configuration. The mobile station device 1 may perform a PDSCH receiving process in the subframe which is indicated as the downlink subframe by the transmission direction UL-DL configuration, on the basis of the detection of the downlink grant through the PDCCH/EPDCCH.

When the transmission of the uplink signal (PUSCH/SRS) in the subframe which is indicated as the downlink subframe by the transmission direction UL-DL configuration is scheduled or set, the mobile station device 1 may perform an uplink signal (PUSCH/SRS) transmitting process in the subframe.

The base station device 3 may schedule uplink transmission in the subframe which is indicated as the uplink subframe by the transmission direction UL-DL configuration.

The base station device 3 may schedule downlink transmission in the subframe which is indicated as the uplink subframe by the transmission direction UL-DL configuration. The scheduling of the downlink transmission by the base station device 3 may be prohibited in the subframe which is indicated as the uplink subframe by the transmission direction UL-DL configuration.

The mobile station device 1 may perform an uplink signal transmitting process in the subframe which is indicated as the uplink subframe by the transmission direction UL-DL configuration. When the transmission of the uplink signal (PUSCH/DMRS/SRS) in the subframe which is indicated as the uplink subframe by the transmission direction UL-DL configuration is scheduled or set, the mobile station device 1 may perform the uplink signal (PUSCH/DMRS/SRS) transmitting process in the subframe.

The mobile station device 1 may perform the downlink signal receiving process in the subframe which is indicated as the uplink subframe by the transmission direction UL-DL configuration and in which uplink transmission is not scheduled. The downlink signal receiving process of the mobile station device 1 may be prohibited in the subframe which is indicated as the uplink subframe by the transmission direction UL-DL configuration.

The base station device 3 may schedule downlink transmission in the DwPTS of the subframe which is indicated as the special subframe by the transmission direction UL-DL configuration.

The mobile station device 1 may perform the downlink signal receiving process in the DwPTS of the subframe which is indicated as the special subframe by the transmission direction UL-DL configuration. The mobile station device 1 may monitor the PDCCH/EPDCCH in the DwPTS of the subframe which is indicated as the special subframe by the transmission direction UL-DL configuration. The mobile station device 1 may perform the PDSCH receiving process in the DwPTS of the subframe which is indicated as the special subframe by the transmission direction UL-DL configuration, on the basis of the detection of the downlink grant through the PDCCH/EPDCCH.

When the transmission of the PUSCH in the subframe which is indicated as the special subframe by the transmission direction UL-DL configuration is scheduled or set, the mobile station device 1 does not perform a PUSCH transmitting process in the subframe.

When the transmission of the SRS in the UpPTS of the subframe which is indicated as the special subframe by the transmission direction UL-DL configuration is scheduled or set, the mobile station device 1 may perform an SRS transmitting process in the UpPTS of the subframe.

FIG. 17 is a diagram illustrating the relationship between the first uplink reference UL-DL configuration, the first downlink reference UL-DL configuration, and the transmission direction UL-DL configuration in this embodiment.

For example, in FIG. 17, when the first uplink reference UL-DL configuration is 0, the first downlink reference UL-DL configuration is one of a set {0, 1, 2, 3, 4, 5, 6}. For example, in FIG. 17, when the first uplink reference UL-DL configuration is 1, the first downlink reference UL-DL configuration is one of a set {1, 2, 4, 5}.

For example, in FIG. 17, when the first uplink reference UL-DL configuration is 0 and the first downlink reference UL-DL configuration is 1, the transmission direction UL-DL configuration is one of a set {0, 1, 6}.

The value of the first downlink reference UL-DL configuration may be equal to the value of the first uplink reference UL-DL configuration. However, the mobile station device 1 which does not receive the second information sets the same value as the value of the first uplink reference UL-DL configuration to the first downlink reference UL-DL configuration. Therefore, preferably, the value of the first downlink reference UL-DL configuration indicated by the second information is not equal to the value of the first uplink reference UL-DL configuration indicated by the first information.

When the value of the first uplink reference UL-DL configuration is equal to the value of the first downlink reference UL-DL configuration, the transmission direction UL-DL configuration may not be defined. Alternatively, when the value of the first uplink reference UL-DL configuration is equal to the value of the first downlink reference UL-DL configuration, the same value as the value of the first uplink reference UL-DL configuration and the value of the first downlink reference UL-DL configuration may be set to the transmission direction UL-DL configuration.

A configuration set (the setting of the set) including the uplink-downlink configuration of the first uplink reference UL-DL configuration and the uplink-downlink configuration of the first downlink reference UL-DL configuration may be used as the configuration set which is limited on the basis of the first uplink reference UL-DL configuration and the first downlink reference UL-DL configuration.

For example, when the first uplink reference UL-DL configuration is 0 and the first downlink reference UL-DL configuration is 1, the configuration set which is limited on the basis of the first uplink reference UL-DL configuration and the first downlink reference UL-DL configuration is {0, 1}. In this case, it is preferable that the third information be 1 bit.

The third information may be information indicating the transmission direction UL-DL configuration in the configuration set (the setting of the set) including the first uplink reference UL-DL configuration and the first downlink reference UL-DL configuration.

Next, the first uplink reference UL-DL configuration and the second uplink reference UL-DL configuration will be described in detail.

The first uplink reference UL-DL configuration and the second uplink reference UL-DL configuration are used to specify (select or determine) the correspondence between subframe n in which a PDCCH/EPDCCH/PHICH is allocated and subframe n+k in which a PUSCH corresponding to the PDCCH/EPDCCH/PHICH is allocated.

When one primary cell is set or when one primary cell and one secondary cell are set and the first uplink reference UL-DL configuration for the primary cell is the same as the first uplink reference UL-DL configuration for the secondary cell, the corresponding first uplink reference UL-DL configuration is used to specify the correspondence between a subframe in which a PDCCH/EPDCCH/PHICH is allocated and a subframe in which a PUSCH corresponding to the PDCCH/EPDCCH/PHICH is allocated, in each of the two serving cells.

When one primary cell and one secondary cell are set and the first uplink reference UL-DL configuration for the primary cell is different from the first uplink reference UL-DL configuration for the secondary cell, the corresponding second uplink reference UL-DL configuration is used to specify the correspondence between a subframe in which a PDCCH/EPDCCH/PHICH is allocated and a subframe in which a PUSCH corresponding to the PDCCH/EPDCCH/PHICH is allocated, in each of the two serving cells.

FIG. 18 is a diagram illustrating the correspondence between subframe n in which a PDCCH/EPDCCH/PHICH is allocated and subframe n+k in which a PUSCH corresponding to the PDCCH/EPDCCH/PHICH is allocated in this embodiment. The mobile station device 1 specifies (selects or determines) the value of k according to the table shown in FIG. 18.

In FIG. 18, when one primary cell is set or when one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 18, when one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 18, the first uplink reference UL-DL configuration and the second uplink reference UL-DL configuration are simply referred to as an uplink-downlink configuration.

When the PDCCH/EPDCCH with the uplink grant, which corresponds to the serving cells to which uplink-downlink configurations 1 to 6 are set and is intended for the mobile station device 1, is detected in subframe n, the mobile station device 1 performs PUSCH transmission corresponding to the uplink grant in subframe n+k which is specified (selected or determined) on the basis of the table shown in FIG. 18.

When the PHICH with the NACK, which corresponds to the serving cells to which uplink-downlink configurations 1 to 6 are set and is intended for the mobile station device 1, is detected in subframe n, the mobile station device 1 performs PUSCH transmission in subframe n+k which is specified (selected or determined) on the basis of the table shown in FIG. 18.

The uplink grant, which corresponds to the serving cell to which uplink-downlink configuration 0 is set and is intended for the mobile station device 1, includes a 2-bit uplink index (UL index). The uplink grant, which corresponds to the serving cells to which uplink-downlink configurations 1 to 6 are set and is intended for the mobile station device 1, does not include the uplink index (UL index).

When the most significant bit (MSB) of the uplink index included in the uplink grant corresponding to the serving cell to which uplink-downlink configuration 0 is set is set to 1 in subframe n, the mobile station device 1 adjusts PUSCH transmission corresponding to the uplink grant in subframe n+k which is specified (selected or determined) on the basis of the table shown in FIG. 18.

When the PHICH with the NACK corresponding to the serving cell to which uplink-downlink configuration 0 is set is received in a first resource set of subframe n=0 or 5, the mobile station device 1 adjusts PUSCH transmission corresponding to the PHICH in subframe n+k which is specified (selected or determined) on the basis of the table shown in FIG. 18.

When the least significant bit (LSB) of the uplink index included in the uplink grant corresponding to the serving cell to which uplink-downlink configuration 0 is set is set to 1 in subframe n, the mobile station device 1 adjusts PUSCH transmission corresponding to the uplink grant in subframe n+7.

When the PHICH with the NACK corresponding to the serving cell to which uplink-downlink configuration 0 is set is received in a second resource set of subframe n=0 or 5, the mobile station device 1 adjusts PUSCH transmission corresponding to the uplink grant in subframe n+7.

When the PHICH with the NACK corresponding to the serving cell to which uplink-downlink configuration 0 is set is received in subframe n=1 or 6, the mobile station device 1, the mobile station device 1 adjusts PUSCH transmission corresponding to the uplink grant in subframe n+7.

For example, when the PDCCH/EPDCCH/PHICH corresponding to the serving cell to which uplink-downlink configuration 0 is set is detected in [SFN=m, subframe 1], the mobile station device 1 adjusts PUSCH transmission in [SFN=m, subframe 7] which is six subframes after subframe 1.

The first uplink reference UL-DL configuration and the second uplink reference UL-DL configuration are used to specify (select or determine) the correspondence between subframe n in which a PHICH is allocated and subframe n-k in which a PUSCH corresponding to the PHICH is allocated.

When one primary cell is set or when one primary cell and one secondary cell are set and the first uplink reference UL-DL configuration for the primary cell is the same as the first uplink reference UL-DL configuration for the secondary cell, the corresponding first uplink reference UL-DL configuration is used to specify (select or determine) the correspondence between subframe n in which a PHICH is allocated and subframe n-k in which a PUSCH corresponding to the PHICH is allocated, in each of the two serving cells.

When one primary cell and one secondary cell are set and the first uplink reference UL-DL configuration for the primary cell is different from the first uplink reference UL-DL configuration for the secondary cell, the corresponding second uplink reference UL-DL configuration is used to specify (select or determine) the correspondence between subframe n in which a PHICH is allocated and subframe n-k in which a PUSCH corresponding to the PHICH is allocated, in each of the two serving cells.

FIG. 19 is a diagram illustrating the correspondence between subframe n in which a PHICH is allocated and subframe n-k in which a PUSCH corresponding to the PHICH is allocated in this embodiment. The mobile station device 1 specifies (selects or determines) the value of k according to the table shown in FIG. 19.

In FIG. 19, when one primary cell is set or when one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 19, when one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 19, the first uplink reference UL-DL configuration and the second uplink reference UL-DL configuration are simply referred to as an uplink-downlink configuration.

The HARQ indicator (HARQ-ACK), which is received through the PHICH corresponding to the serving cells to which uplink-downlink configurations 1 to 6 are set in subframe n, is related to the transmission of the PUSCH in subframe n-k that is specified on the basis of the table shown in FIG. 19.

The HARQ indicator (HARQ-ACK), which is received through the PHICH corresponding to the serving cell to which uplink-downlink configuration 0 is set in the first resource set of subframe n=0 or 5 or subframe n=1 or 6, is related to the transmission of the PUSCH in subframe n-k that is specified on the basis of the table shown in FIG. 19.

The HARQ indicator (HARQ-ACK), which is received through the PHICH corresponding to the serving cell to which uplink-downlink configuration 0 is set in the second resource set of subframe n=0 or 5, is related to the transmission of the PUSCH in subframe n-6.

For example, the HARQ indicator (HARQ-ACK), which is received through the PHICH corresponding to the serving cell to which uplink-downlink configuration 1 is set in the [SFN=m, subframe 1], is related to the transmission of the PUSCH in [SFN=m−1, subframe 7] that is four subframes before subframe 1.

The first uplink reference UL-DL configuration and the second uplink reference UL-DL configuration are used to specify (select or determine) the correspondence between subframe n in which a PUSCH is allocated and subframe n+k in which a PHICH corresponding to the PUSCH is allocated.

When one primary cell is set or when one primary cell and one secondary cell are set and the first uplink reference UL-DL configuration for the primary cell is the same as the first uplink reference UL-DL configuration for the secondary cell, the corresponding first uplink reference UL-DL configuration is used to specify (select or determine) the correspondence between subframe n in which a PUSCH is allocated and subframe n+k in which a PHICH corresponding to the PUSCH is allocated, in each of the two serving cells.

When one primary cell and one secondary cell are set and the first uplink reference UL-DL configuration for the primary cell is different from the first uplink reference UL-DL configuration for the secondary cell, the corresponding second uplink reference UL-DL configuration is used to specify (select or determine) the correspondence between subframe n in which a PUSCH is allocated and subframe n+k in which a PHICH corresponding to the PUSCH is allocated, in each of the two serving cells.

FIG. 20 is a diagram illustrating the correspondence between subframe n in which a PUSCH is allocated and subframe n+k in which a PHICH corresponding to the PUSCH is allocated in this embodiment. The mobile station device 1 specifies (selects or determines) the value of k according to the table shown in FIG. 20.

In FIG. 20, when one primary cell is set or when one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 20, when one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 20, the first uplink reference UL-DL configuration and the second uplink reference UL-DL configuration are simply referred to as an uplink-downlink configuration.

When the transmission of the PUSCH is scheduled in subframe n, the mobile station device 1 determines a PHICH resource in subframe n+k that is specified on the basis of the table shown in FIG. 20.

For example, when the transmission of the PUSCH corresponding to the serving cell to which uplink-downlink configuration 0 is set is scheduled in [SFN=m, subframe n=2], the PHICH resource is determined in [SFN=m, subframe n=6].

For example, when the transmission of the PUSCH corresponding to the serving cell to which uplink-downlink configuration 0 is set is scheduled in [SFN=m, subframe n=3], the PHICH resource is determined from a first resource set in [SFN=m+1, subframe n=0].

For example, when the transmission of the PUSCH corresponding to the serving cell to which uplink-downlink configuration 0 is set is scheduled in [SFN=m, subframe n=4], the PHICH resource is determined from a second resource set in [SFN=m+1, subframe n=0].

For example, when the transmission of the PUSCH corresponding to the serving cell to which uplink-downlink configuration 0 is set is scheduled in [SFN=m, subframe n=7], the PHICH resource is determined in [SFN=m+1, subframe n=1].

For example, when the transmission of the PUSCH corresponding to the serving cell to which uplink-downlink configuration 0 is set is scheduled in [SFN=m, subframe n=8], the PHICH resource is determined from the first resource set in [SFN=m+1, subframe n=5].

For example, when the transmission of the PUSCH corresponding to the serving cell to which uplink-downlink configuration 0 is set is scheduled in [SFN=m, subframe n=9], the PHICH resource is determined from the second resource set in [SFN=m+1, subframe n=5].

Next, the first downlink reference UL-DL configuration and the second downlink reference UL-DL configuration will be described.

The first downlink reference UL-DL configuration and the second downlink reference UL-DL configuration are used to specify (select or determine) the correspondence between subframe n in which a PDSCH is allocated and subframe n+k in which an HARQ-ACK corresponding to the PDSCH is transmitted.

When one primary cell is set or when one primary cell and one secondary cell are set and the first downlink reference UL-DL configuration for the primary cell is the same as the first downlink reference UL-DL configuration for the secondary cell, the corresponding first downlink reference UL-DL configuration is used to specify (select or determine) the correspondence between subframe n in which a PDSCH is allocated and subframe n+k in which an HARQ-ACK corresponding to the PDSCH is transmitted, in each of the two serving cells.

When one primary cell and one secondary cell are set and the first downlink reference UL-DL configuration for the primary cell is different from the first downlink reference UL-DL configuration for the secondary cell, the corresponding second downlink reference UL-DL configuration is used to specify (select or determine) the correspondence between subframe n in which a PDSCH is allocated and subframe n+k in which an HARQ-ACK corresponding to the PDSCH is transmitted, in each of the two serving cells.

FIG. 21 is a diagram illustrating the correspondence between subframe n-k in which a PDSCH is allocated and subframe n in which an HARQ-ACK corresponding to the PDSCH is transmitted in this embodiment. The mobile station device 1 specifies (selects or determines) the value of k according to the table shown in FIG. 21.

In FIG. 21, when one primary cell is set or when one primary cell and one secondary cell are set and the first downlink reference UL-DL configuration for the primary cell is the same as the first downlink reference UL-DL configuration for the secondary cell, the uplink-downlink configuration refers to the first downlink reference UL-DL configuration.

In FIG. 21, when one primary cell and one secondary cell are set and the first downlink reference UL-DL configuration for the primary cell is different from the first downlink reference UL-DL configuration for the secondary cell, the uplink-downlink configuration refers to the second downlink reference UL-DL configuration.

Hereinafter, in the description of FIG. 21, the first downlink reference UL-DL configuration and the second downlink reference UL-DL configuration are simply referred to as an uplink-downlink configuration.

When the mobile station device 1 detects, in subframe n-k (k is specified by the table shown in FIG. 21) of the serving cell, transmission of the PDSCH intended for the mobile station device 1 and for which a corresponding HARQ-ACK shall be transmitted, the mobile station device 1 transmits the HARQ-ACK in subframe n.

For example, the mobile station device 1 does not transmit a response to the HARQ-ACK for PDSCH transmission which is used to transmit system information. For example, the mobile station device 1 transmits a response to the HARQ-ACK for PDSCH transmission which is scheduled by the DCI format with the CRC that is scrambled with the C-RNTI.

For example, the mobile station device 1 transmits the HARQ-ACK for the PDSCH, which is received in subframe n−6 and/or n−7 of the serving cell to which uplink-downlink configuration 1 is set, in subframe n=2.

When the first uplink reference UL-DL configuration is set and the first downlink reference UL-DL configuration and the transmission direction UL-DL configuration are not set, the mobile station device 1 may specify (select or determine) the transmission direction (downward/upward) on the basis of the first uplink reference UL-DL configuration.

When the first uplink reference UL-DL configuration and the first downlink reference UL-DL configuration are set and the transmission direction UL-DL configuration is not set, the mobile station device 1 may specify (select or determine) the transmission direction (downward/upward) on the basis of the first downlink reference UL-DL configuration.

The first downlink reference UL-DL configuration may not be set for the serving cell for which the second information is not received. In this case, the mobile station device 1 and the base station device 3 may perform the previous described process based on the first downlink reference UL-DL configuration, on the basis of the first uplink reference UL-DL configuration (serving cell UL-DL configuration). The dynamic TDD is not set for the serving cell for which the second information is not received.

For example, when one primary cell and one secondary cell are set, the second information on the primary cell is not received, the second information on the secondary cell is received, the first uplink reference UL-DL configuration (serving cell UL-DL configuration) for the primary cell is different from the first downlink reference UL-DL configuration for the secondary cell, and the serving cell is the secondary cell, the second downlink reference UL-DL configuration for the serving cell (secondary cell) may be set on the basis of a pair which is formed by the first uplink reference UL-DL configuration for the other serving cell (primary cell) and the first downlink reference UL-DL configuration for the serving cell (secondary cell).

For example, when one primary cell and one secondary cell are set, the second information on the primary cell is not received, the second information on the secondary cell is received, and the first uplink reference UL-DL configuration (serving cell UL-DL configuration) for the primary cell is different from the first downlink reference UL-DL configuration for the secondary cell, for each of the two serving cells, the corresponding second downlink reference UL-DL configuration may be used to specify (select or determine) the correspondence between subframe n in which a PDSCH is allocated and subframe n+k in which an HARQ-ACK corresponding to the PDSCH is transmitted.

For example, when one primary cell and one secondary cell are set, the second information on the primary cell is not received, the second information on the secondary cell is received, and the first uplink reference UL-DL configuration (serving cell UL-DL configuration) for the primary cell is the same as the first downlink reference UL-DL configuration for the secondary cell, for the primary cell the corresponding first uplink reference UL-DL configuration (serving cell UL-DL configuration) may be used to specify (select or determine) the correspondence between subframe n in which a PDSCH is allocated and subframe n+k in which a HARQ-ACK corresponding to the PDSCH is transmitted and for the secondary cell the corresponding first downlink reference UL-DL configuration may be used to specify (select or determine) the correspondence between subframe n in which a PDSCH is allocated and subframe n+k in which an HARQ-ACK corresponding to the PDSCH is transmitted.

For example, when one primary cell and one secondary cell are set, the second information on the primary cell is not received, the second information on the secondary cell is received, and the first uplink reference UL-DL configuration (serving cell UL-DL configuration) for the primary cell is different from the first downlink reference UL-DL configuration for the secondary cell, the primary cell UL-DL configuration in FIGS. 12 and 14 refers to the first uplink reference UL-DL configuration for the primary cell.

The program which runs on the base station device 3 and the mobile station device 1 according to the invention may be a program (which causes a computer to function) which controls a central processing unit (CPU) such that the functions of the above-described embodiment of the invention are implemented. The information handled by these devices is temporarily stored in a random access memory (RAM) during the process and is then stored in various types of read only memories (ROMs), such as a flash ROM, or a hard disk drive (HDD). Then, the CPU reads, corrects, and writes the information, if necessary.

Some functions of the mobile station device 1 and the base station device 3 according to the above-described embodiment may be implemented by a computer. In this case, a program for implementing the control function may be recorded on a computer-readable recording medium and a computer system may read the program recorded on the recording medium and execute the program to implement the functions.

The term "computer system" means a computer system that is provided with the mobile station device 1 or the base station device 3 and includes an OS or hardware such as peripheral devices. The term "computer-readable recording medium" means a portable medium, such as a flexible disk, a magneto-optical disk, a ROM, or a CD-ROM, or a storing device, such as a hard disc provided in the computer system.

The "computer-readable recording medium" may include a recording medium that dynamically stores the program in a short time, such as a communication cable used when the program is transmitted through a network, such as the Internet, or a communication line, such as a telephone line, and a recording medium that stores the program for a predetermined period of time, such as a volatile memory in a computer system that serves as a server or a client in this case. The "program" may be a program that implements some of the above-mentioned functions or a program that implements the above-mentioned functions in combination with the program which has been stored in the computer system.

The base station device 3 according to the above-described embodiment may be realized as an aggregate (device group) of a plurality of devices. Each of the devices forming the device group may have some or all of the functions or the functional blocks of the base station device 3 according to the above-described embodiment. The device group may have each function or each functional block of the base station device 3. The mobile station device 1 according to the above-described embodiment can communicate with the base station device which is an aggregate of devices.

The base station device 3 according to the above-described embodiment may be an evolved universal terrestrial radio access network (EUTRAN). In addition, the base station device 3 according to the above-described embodiment may have some or all of the functions of a higher node of eNodeB.

Each of the mobile station device 1 and the base station device 3 according to the above-described embodiments may be partly or entirely realized in the form of an LSI, which is a typical integrated circuit, or a chip set. Each functional block of the mobile station device 1 and the base station device 3 may be individually integrated into a chip, or some or all of the functional blocks may be integrated into a chip. A method for achieving the integrated circuit is not limited to the LSI and it may be achieved by a dedicated circuit or a general-purpose processor. In addition, when a technique for achieving an integrated circuit which replaces the LSI technique will be developed with the progress of a semiconductor technique, the integrated circuit manufactured by the developed technique can also be used.

In the above-described embodiment, the mobile station device is given as an example of a terminal device or a communication device. However, the invention is not limited thereto. The invention can also be applied to terminal devices or communication devices of stationary or non-movable electronic apparatuses which are installed indoors or outdoors, such as AV apparatuses, kitchen devices, cleaning and washing machines, air conditioners, office devices, vending machines, and other home appliances.

The embodiment of the invention has been described above in detail with reference to the drawings. However, the detailed structure is not limited to the above-described embodiment and the invention also includes a change in the design within the scope and spirit of the invention. Various modifications and changes of the invention can be made without departing from the scope of the claims and the technical range of the invention includes embodiments obtained by appropriately combining technical means described in different embodiments. In addition, the elements which are described in each of the above-described embodiments and have the same effect may be replaced with each other.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEIVING UNIT
107 TRANSMITTING UNIT
301 HIGHER LAYER PROCESSING UNIT
303 CONTROL UNIT
305 RECEIVING UNIT
307 TRANSMITTING UNIT
1011 RADIO RESOURCE CONTROL UNIT
1013 SUBFRAME SETTING UNIT
1015 SCHEDULING INFORMATION INTERPRETATION UNIT
3011 RADIO RESOURCE CONTROL UNIT
3013 SUBFRAME SETTING UNIT
3015 SCHEDULING UNIT

The invention claimed is:

1. A terminal apparatus that communicates with a base station apparatus, using time division duplex, on two serving cells comprising of a primary cell and a secondary cell, the terminal apparatus comprising:
reception circuitry that receives first uplink-reference configuration for the primary cell, second uplink-reference configuration for the secondary cell, third uplink-reference configuration for the primary cell, fourth uplink-reference configuration for the secondary cell, and first downlink-reference configuration for the secondary cell,
wherein
the first uplink-reference configuration for the primary cell indicates a configuration in which at least an uplink subframe, a downlink subframe, and a special subframe are defined, the second uplink-reference configuration for the secondary cell indicates a configuration in which at least an uplink subframe, a downlink subframe, and a special subframe are defined, the third uplink-reference configuration for the primary cell indicates a configuration in which at least an uplink subframe, a downlink subframe, and a special subframe are defined, the fourth uplink-reference configuration for the secondary cell indicates a configuration in which at least an uplink subframe, a downlink subframe, and a special subframe are defined, and the first downlink-reference configuration for the secondary cell indicates a configuration in which at least an uplink subframe, a downlink subframe, and a special subframe are defined; and
transmission circuitry that
transmits a physical uplink shared channel in a subframe n+k1 on the primary cell based on a detection of a physical downlink control channel in a subframe n, the k1 given based on the third uplink-reference configuration for the primary cell,
transmits a physical uplink shared channel in a subframe n+k2 on the secondary cell based on a detection of a physical downlink control channel in a subframe n, the k2 given based on the fourth uplink-reference configuration for the secondary cell, the k2 being different from k1,
transmits a HARQ-ACK (hybrid automatic repeat request acknowledgement) in subframe m based on a detection of a physical downlink shared channel in subframe m-j on the primary cell, the j given based on second downlink-reference configuration for the primary cell, and
transmits a HARQ-ACK in subframe m based on a detection of a physical downlink shared channel in subframe m-j on the secondary cell, the j given based on third downlink-reference configuration for the secondary cell, wherein the third uplink-reference configuration for the primary cell and the fourth uplink-reference configuration for the secondary cell being used for scheduling of sounding reference signal transmission,
if the configuration given by the first uplink-reference configuration for the primary cell and the configuration given by the second uplink-reference configuration for the secondary cell are different, the configuration given by the first uplink-reference configuration for the primary cell is the third uplink-reference configuration for the primary cell,
if the configuration given by the first uplink-reference configuration for the primary cell and the configuration given by the second uplink-reference configuration for the secondary cell are different and if the terminal apparatus does not monitor a physical downlink control channel in the primary cell for scheduling the secondary cell, the configuration given by the second uplink-reference configuration for the secondary cell is the fourth uplink-reference configuration for the secondary cell, and if the configuration given by the first uplink-reference configuration for the primary cell and the configuration given by the first downlink-reference configuration for the secondary cell are different, the configuration given by the first uplink-reference configuration for the primary cell is the second downlink-reference configuration for the primary cell, and the third downlink-reference configuration for the secondary cell is given based on a pair formed by the configuration given by the first uplink-reference configuration for the primary cell and the configuration given by the first downlink-reference configuration for the secondary cell.

2. The terminal apparatus according to claim 1, wherein
if the configuration given by the first uplink-reference configuration for the primary cell and the configuration given by the second uplink-reference configuration for the secondary cell are different and if the terminal apparatus monitors a physical downlink control channel in the primary cell for scheduling the secondary cell, the fourth uplink-reference configuration for the secondary cell is given based on a pair formed by the configuration given by the first uplink-reference configuration for the primary cell and the configuration given by the second uplink-reference configuration for the secondary cell.

3. The terminal apparatus according to claim 1, wherein
the reception circuitry receives the third uplink-reference configuration for the primary cell, wherein the third uplink-reference configuration for the primary cell indicates a configuration, and
if the third uplink-reference configuration for the primary cell is configured and if the configuration given by the third uplink-reference configuration for the primary cell and the configuration given by the first downlink-reference configuration for the secondary cell are different, the configuration given by the third uplink-reference configuration for the primary cell is the second downlink-reference configuration for the primary cell, and the third downlink-reference configuration for the secondary cell is given based on a pair formed by the configuration given by the third uplink-reference configuration for the primary cell and the configuration given by the first downlink-reference configuration for the secondary cell.

4. A radio communication method used for a terminal apparatus that communicates with a base station apparatus, using time division duplex, on two serving cells comprising of a primary cell and a secondary cell, the radio communication method comprising:
receiving first uplink-reference configuration for the primary cell, second uplink-reference configuration for the secondary cell, third uplink-reference configuration for the primary cell, fourth uplink-reference configuration for the secondary cell, and first downlink-reference configuration for the secondary cell,
wherein
the first uplink-reference configuration for the primary cell indicates a configuration in which at least an uplink subframe, a downlink subframe, and a special subframe are defined, the second uplink-reference configuration for the secondary cell indicates a configuration in which at least an uplink subframe, a downlink subframe, and a special subframe are defined, the third uplink-reference configuration for the primary cell indicates a configuration in which at least an uplink subframe, a downlink subframe, and a special subframe are defined, the fourth uplink-reference configuration for the secondary cell indicates a configuration in which at least an uplink subframe, a downlink subframe, and a special subframe are defined, and the first downlink-reference configuration for the secondary cell indicates a configuration in which at least an uplink subframe, a downlink subframe, and a special subframe are defined;
transmitting a physical uplink shared channel in a subframe n+k1 on the primary cell based on a detection of a physical downlink control channel in a subframe n, the k1 given based on the third uplink-reference configuration for the primary cell;
transmitting a physical uplink shared channel in a subframe n+k2 on the secondary cell based on a detection of a physical downlink control channel in a subframe n, the k2 given based on the fourth uplink-reference configuration for the secondary cell, the k2 being different from k1;
transmitting a HARQ-ACK (hybrid automatic repeat request acknowledgement) in subframe m based on a detection of a physical downlink shared channel in subframe m-j on the primary cell, the j given based on second downlink-reference configuration for the primary cell; and
transmitting a HARQ-ACK in subframe m based on a detection of a physical downlink shared channel in subframe m-j on the secondary cell, the j given based on third downlink-reference configuration for the secondary cell, wherein the third uplink-reference configuration for the primary cell and the fourth uplink-reference configuration for the secondary cell being used for scheduling of sounding reference signal transmission,
if the configuration given by the first uplink-reference configuration for the primary cell and the configuration given by the second uplink-reference configuration for the secondary cell are different, the configuration given by the first uplink-reference configuration for the primary cell is the third uplink-reference configuration for the primary cell,
if the configuration given by the first uplink-reference configuration for the primary cell and the configuration given by the second uplink-reference configuration for the secondary cell are different and if the terminal apparatus does not monitor a physical downlink control channel in the primary cell for scheduling the secondary cell, the configuration given by the second uplink-reference configuration for the secondary cell is the fourth uplink-reference configuration for the secondary cell, and
if the configuration given by the first uplink-reference configuration for the primary cell and the configuration given by the first downlink-reference configuration for the secondary cell are different, the configuration given by the first uplink-reference configuration for the primary cell is the second downlink-reference configuration for the primary cell, and the third downlink-reference configuration for the secondary cell is given based on a pair formed by the configuration given by the first uplink-reference configuration for the primary cell and the configuration given by the first downlink-reference configuration for the secondary cell.

5. The radio communication method according to claim 4, wherein
if the configuration given by the first uplink-reference configuration for the primary cell and the configuration given by the second uplink-reference configuration for the secondary cell are different and if the terminal apparatus monitors a physical downlink control channel in the primary cell for scheduling the secondary cell, the fourth uplink-reference configuration for the secondary cell is given based on a pair formed by the configuration given by the first uplink-reference configuration for the primary cell and the configuration given by the second uplink-reference configuration for the secondary cell.

6. The radio communication method according to claim 4, the radio communication method further comprising:
receiving the third uplink-reference configuration for the primary cell,
wherein
the third uplink-reference configuration for the primary cell indicates a configuration, and
if the third uplink-reference configuration for the primary cell is configured and if the configuration given by the third uplink-reference configuration for the primary cell and the configuration given by the second downlink-reference configuration for the secondary cell are different, the configuration given by the third uplink-reference configuration for the primary cell is the second downlink-reference configuration for the primary cell, and the third downlink-reference configuration for the secondary cell is given based on a pair formed by the configuration given by the third uplink-reference configuration for the primary cell and the configuration given by the first downlink-reference configuration for the secondary cell.

7. A base station apparatus that communicates with a terminal apparatus, using time division duplex on two serving cells comprising of a primary cell and a secondary cell, the base station apparatus comprising:
transmission circuitry that transmits first uplink-reference configuration for the primary cell, second uplink-reference configuration for the secondary cell, third uplink-reference configuration for the primary cell, fourth uplink-reference configuration for the secondary cell, and first downlink-reference configuration for the secondary cell,
wherein
the first uplink-reference configuration for the primary cell indicates a configuration in which at least an uplink subframe, a downlink subframe, and a special subframe are defined, the second uplink-reference configuration for the secondary cell indicates a configuration in which at least an uplink subframe, a downlink subframe, and a special subframe are defined, the third uplink-reference configuration for the primary cell indicates a configuration in which at least an uplink subframe, a downlink subframe, and a special subframe are defined, the fourth uplink-reference configuration for the secondary cell indicates a configuration in which at least an uplink subframe, a downlink subframe, and a special subframe are defined, and the first downlink-reference configuration for the secondary cell indicates a configuration in which at least an uplink subframe, a downlink subframe, and a special subframe are defined; and
reception circuitry that
receives a physical uplink shared channel in a subframe n+k1 on the primary cell based on a detection of a physical downlink control channel in a subframe n, the k1 given based on the third uplink-reference configuration for the primary cell,
receives a physical uplink shared channel in a subframe n+k2 on the secondary cell based on a detection of a physical downlink control channel in a subframe n, the k2 given based on the fourth uplink-reference configuration for the secondary cell, the k2 being different from k1,
receives a HARQ-ACK (hybrid automatic repeat request acknowledgement) in subframe m based on a detection of a physical downlink shared channel in subframe m-j on the primary cell, the j given based on second downlink-reference configuration for the primary cell, and
receives a HARQ-ACK in subframe m based on a detection of a physical downlink shared channel in subframe m-j on the secondary cell, the j given based on third downlink-reference configuration for the secondary cell, wherein the third uplink-reference configuration for the primary cell and the fourth uplink-reference configuration for the secondary cell being used for scheduling of sounding reference signal transmission,
if the configuration given by the first uplink-reference configuration for the primary cell and the configuration given by the second uplink-reference configuration for the secondary cell are different, the configuration given by the first uplink-reference configuration for the primary cell is the third uplink-reference configuration for the primary cell,
if the configuration given by the first uplink-reference configuration for the primary cell and the configuration given by the second uplink-reference configuration for the secondary cell are different and if the terminal apparatus is not monitoring a physical downlink control channel in the primary cell for scheduling the secondary cell, the configuration given by the second uplink-reference configuration for the secondary cell is the fourth uplink-reference configuration for the secondary cell, and
if the configuration given by the first uplink-reference configuration for the primary cell and the configuration given by the first downlink-reference configuration for the secondary cell are different, the configuration given by the first uplink-reference configuration for the primary cell is the second downlink-reference configuration for the primary cell, and the third downlink-reference configuration for the secondary cell is given based on a pair formed by the configuration given by the first uplink-reference configuration for the primary cell and the configuration given by the second downlink-reference configuration for the secondary cell.

8. The base station apparatus according to claim 7, wherein
if the configuration given by the first uplink-reference configuration for the primary cell and the configuration given by the second uplink-reference configuration for the secondary cell are different and if the terminal apparatus monitors a physical downlink control channel in the primary cell for scheduling the secondary cell, the fourth uplink-reference configuration for the secondary cell is given based on a pair formed by the configuration given by the first uplink-reference configuration for the primary cell and the configuration given by the second uplink-reference configuration for the secondary cell.

9. The base station apparatus according to claim 7, wherein
the transmission circuitry transmits the third uplink-reference configuration for the primary cell, the third uplink-reference configuration for the primary cell indicates a configuration, and if the third uplink-reference configuration for the primary cell is configured and if the configuration given by the third uplink-reference configuration for the primary cell and the configuration given by the first downlink-reference configuration for the secondary cell are different, the configuration given by the third uplink-reference configuration for the primary cell is the second downlink-reference configuration for the primary cell, and the third downlink-reference configuration for the secondary cell is given based on a pair formed by the configuration given by the second uplink-reference configuration for the primary cell and the configuration given by the first downlink-reference configuration for the secondary cell.

10. A radio communication method used for a base station apparatus that communicates with a terminal apparatus, using time division duplex, on two serving cells comprising of a primary cell and a secondary cell, the radio communication method comprising:

transmitting first uplink-reference configuration for the primary cell, second uplink-reference configuration for the secondary cell, third uplink-reference configuration for the Primary cell, fourth uplink-reference configuration for the secondary cell, and first downlink-reference configuration for the secondary cell, wherein the first uplink-reference configuration for the primary cell indicates a configuration in which at least an uplink subframe, a downlink subframe, and a special subframe are defined, the second uplink-reference configuration for the secondary cell indicates a configuration in which at least an uplink subframe, a downlink subframe, and a special subframe are defined, the third uplink-reference configuration for the primary cell indicates a configuration in which at least an uplink subframe, a downlink subframe, and a special subframe are defined, the fourth uplink-reference configuration for the secondary cell indicates a configuration in which at least an uplink subframe, a downlink subframe, and a special subframe are defined, and the first downlink-reference configuration for the secondary cell indicates a configuration in which at least an uplink subframe, a downlink subframe, and a special subframe are defined;

receiving a physical uplink shared channel in a subframe n+k1 on the primary cell based on a detection of a physical downlink control channel in a subframe n, the k1 given based on the third uplink-reference configuration for the primary cell;

receiving a physical uplink shared channel in a subframe n+k2 on the secondary cell based on a detection of a physical downlink control channel in a subframe n, the k2 given based on the fourth uplink-reference configuration for the secondary cell, the k2 being different from k1;

receiving a HARQ-ACK (hybrid automatic repeat request acknowledgement) in subframe m based on a detection of a physical downlink shared channel in subframe m-j on the primary cell, the j given based on a second downlink-reference configuration for the primary cell; and receiving a HARQ-ACK in subframe m based on a detection of a physical downlink shared channel in subframe m-j on the secondary cell, the j given based on third downlink-reference configuration for the secondary cell, wherein the third uplink-reference configuration for the primary cell and the fourth uplink-reference configuration for the secondary cell being used for scheduling of sounding reference signal transmission, if the configuration given by the first uplink-reference configuration for the primary cell and the configuration given by the second uplink-reference configuration for the secondary cell are different, the configuration given by the first uplink-reference configuration for the primary cell is the third uplink-reference configuration for the primary cell, if the configuration given by the first uplink-reference configuration for the primary cell and the configuration given by the second uplink-reference configuration for the secondary cell are different and if the terminal apparatus does not monitor a physical downlink control channel in the primary cell for scheduling the secondary cell, the configuration given by the second uplink-reference configuration for the secondary cell is the fourth uplink-reference configuration for the secondary cell, and if the configuration given by the first uplink-reference configuration for the primary cell and the configuration given by the first downlink-reference configuration for the secondary cell are different, the configuration given by the first uplink-reference configuration for the primary cell is the second downlink-reference configuration for the primary cell, and the third downlink-reference configuration for the secondary cell is given based on a pair formed by the configuration given by the first uplink-reference configuration for the primary cell and the configuration given by the first downlink-reference configuration for the secondary cell.

11. The radio communication method according to claim 10, wherein if the configuration given by the first uplink-reference configuration for the primary cell and the configuration given by the second uplink-reference configuration for the secondary cell are different and if the terminal apparatus monitors a physical downlink control channel in the primary cell for scheduling the secondary cell, the fourth uplink-reference configuration for the secondary cell is given based on a pair formed by the configuration given by the first uplink-reference configuration for the primary cell and the configuration given by the second uplink-reference configuration for the secondary cell.

12. The radio communication method according to claim 10, the radio communication method further comprising:

transmitting the third uplink-reference configuration for the primary cell, wherein the third uplink-reference configuration for the primary cell indicates a configuration, and if the third uplink-reference configuration for the primary cell is configured and if the configuration given by the third uplink-reference configuration for the primary cell and the configuration given by the first downlink-reference configuration for the secondary cell are different, the configuration given by the third uplink-reference configuration for the primary cell is the second downlink-reference configuration for the primary cell, and the third downlink-reference configuration for the secondary cell is given based on a pair formed by the configuration given by the third uplink-reference configuration for the primary cell and the configuration given by the first downlink-reference configuration for the secondary cell.

* * * * *